US012785323B2

(12) United States Patent
Kanematsu et al.

(10) Patent No.: US 12,785,323 B2
(45) Date of Patent: *Nov. 3, 2026

(54) SHIELD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Kanematsu, Mie (JP); Hiroya Tanaka, Mie (JP); Sunghyun Byun, Mie (JP); Junichi Mukuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 303 days.

This patent is subject to a terminal disclaimer.

(21) Appl. No.: 18/710,967

(22) PCT Filed: Nov. 16, 2022

(86) PCT No.: PCT/JP2022/042502

§ 371 (c)(1),
(2) Date: May 16, 2024

(87) PCT Pub. No.: WO2023/095693

PCT Pub. Date: Jun. 1, 2023

(65) Prior Publication Data

US 2025/0023291 A1 Jan. 16, 2025

(30) Foreign Application Priority Data

Nov. 24, 2021 (JP) ................................ 2021-189975
Jan. 25, 2022 (JP) ................................ 2022-009601

(51) Int. Cl.
*H01R 13/533* (2006.01)
*H01R 13/187* (2006.01)

(52) U.S. Cl.
CPC ......... *H01R 13/533* (2013.01); *H01R 13/187* (2013.01); *H01R 2201/26* (2013.01)

(58) Field of Classification Search
CPC ................ H01R 13/533; H01R 13/187; H01R 2201/26; H01R 13/111; H01R 13/113
See application file for complete search history.

(56) References Cited

U.S. PATENT DOCUMENTS

2011/0130028 A1* 6/2011 Takehara ............... H01R 13/53 439/485
2012/0052747 A1 3/2012 Kataoka et al.

(Continued)

FOREIGN PATENT DOCUMENTS

JP 2014-154243 A 8/2014
JP 2018-113119 A 7/2018

OTHER PUBLICATIONS

International Search Report issued on Feb. 7, 2023 for WO 2023/095693 A1 (4 pages).

*Primary Examiner* — Abdullah A Riyami
*Assistant Examiner* — Nader J Alhawamdeh
(74) *Attorney, Agent, or Firm* — Venjuris, P.C.

(57) ABSTRACT

A shield connector includes a terminal fitting including a mating terminal arrangement portion, a mating terminal being inserted into the mating terminal arrangement portion, and a terminal connecting portion to be connected to the mating terminal inserted and arranged in the mating terminal arrangement portion, an insulating housing for accommodating the terminal fitting, a shield shell for covering an outer surface of the housing, an insulating heat dissipating member having a connecting portion side contact surface to be held in contact with the terminal connecting portion and (Continued)

a shell side contact surface to be exposed from the housing and held in contact with the shield shell with the mating terminal arranged in the mating terminal arrangement portion, and a spring member.

10 Claims, 20 Drawing Sheets

(56) References Cited

U.S. PATENT DOCUMENTS

| | | | | |
|---|---|---|---|---|
| 2017/0346248 | A1 | 11/2017 | Eckel et al. | |
| 2019/0190185 | A1* | 6/2019 | Mori | H01R 13/512 |
| 2020/0153163 | A1 | 5/2020 | Guetig et al. | |
| 2022/0013960 | A1 | 1/2022 | Guetig et al. | |
| 2023/0115788 | A1 | 4/2023 | Kanematsu et al. | |
| 2025/0023291 | A1* | 1/2025 | Kanematsu | H01R 13/533 |
| 2025/0192481 | A1* | 6/2025 | Tanaka | H01R 13/6594 |

* cited by examiner

SHIELD CONNECTOR

CROSS REFERENCE TO RELATED APPLICATIONS

This application is a national phase of PCT application No. PCT/JP2022/042502, filed on 16 Nov. 2022, which claims priority from Japanese patent application Nos. 2021-189975 and 2022-009601, filed on Nov. 24, 2021 and Jan. 25, 2022, respectively, all of which are incorporated herein by reference.

TECHNICAL FIELD

The present disclosure relates to a shield connector.

BACKGROUND

Patent Document 1 discloses a shield connector provided with a terminal fitting including a terminal connecting portion to be connected to a mating terminal, a wire connected to a wire connecting portion of the terminal fitting and a shield shell made of metal for covering the wire connecting portion of the terminal fitting and the wire, the wire connecting portion and the shield shell being integrated by an insulating resin portion formed by insert molding. In this shield connector, the wire connecting portion of the terminal fitting is integrated with the shield shell by being tightly covered by the insulating resin portion filled to eliminate an air layer in the shield shell by insert molding. Thus, heat generated on an electrically conductive path is quickly transferred from the insulating resin portion to the shield shell made of metal without via an air layer and dissipated, wherefore the heat dissipation of the shield connector can be improved.

PRIOR ART DOCUMENT

Patent Document

Patent Document 1: JP 2018-113119 A

SUMMARY OF THE INVENTION

Problems to be Solved

In the shield connector described in Patent Document 1, there is a conceivable possibility of reducing desired heat dissipation performance if a short shot or a void (gap) occurs due to resin fluidity when the insulating resin portion is molded. Further, since a linear expansion coefficient is different between the insulating resin portion and the shield connector and the terminal fitting made of metal, there is a conceivable possibility that an air layer (gap) is formed between contact surfaces of the insulating resin portion and the shield connector and the terminal fitting made of metal due to an environmental temperature change during use and heat dissipation performance is reduced. Furthermore, since the insulating resin portion is in contact with the wire connecting portion of the terminal fitting, there has been an inherent problem that a distance from the terminal connecting portion where heat is generated most on the electrically conductive path to the shield shell, which is a heat dissipating part, is long and thermal resistance is large.

Accordingly, a shield connector of a novel structure is disclosed which can stably exhibit desired heat dissipation performance in a shorter heat dissipation path by suppressing a reduction in heat dissipation performance due to an environmental temperature change.

Means to Solve the Problem

The present disclosure is directed to a shield connector with a terminal fitting including a mating terminal arrangement portion, a mating terminal being inserted into the mating terminal arrangement portion, and a terminal connecting portion to be connected to the mating terminal inserted and arranged in the mating terminal arrangement portion, an insulating housing for accommodating the terminal fitting, a shield shell for covering an outer surface of the housing, an insulating heat dissipating member having a connecting portion side contact surface to be held in contact with the terminal connecting portion and a shell side contact surface to be exposed from the housing and held in contact with the shield shell with the mating terminal arranged in the mating terminal arrangement portion, and a spring member for pressing the terminal connecting portion against the connecting portion side contact surface of the heat dissipating member and pressing the shell side contact surface of the heat dissipating member against the shield shell.

Effect of the Invention

According to the shield connector of the present disclosure, desired heat dissipation performance can be exhibited in a shorter heat dissipation path by suppressing a reduction in heat dissipation performance due to an environmental temperature change.

DETAILED DESCRIPTION TO EXECUTE THE INVENTION

Description of Embodiments of Present Disclosure

Figure 1:
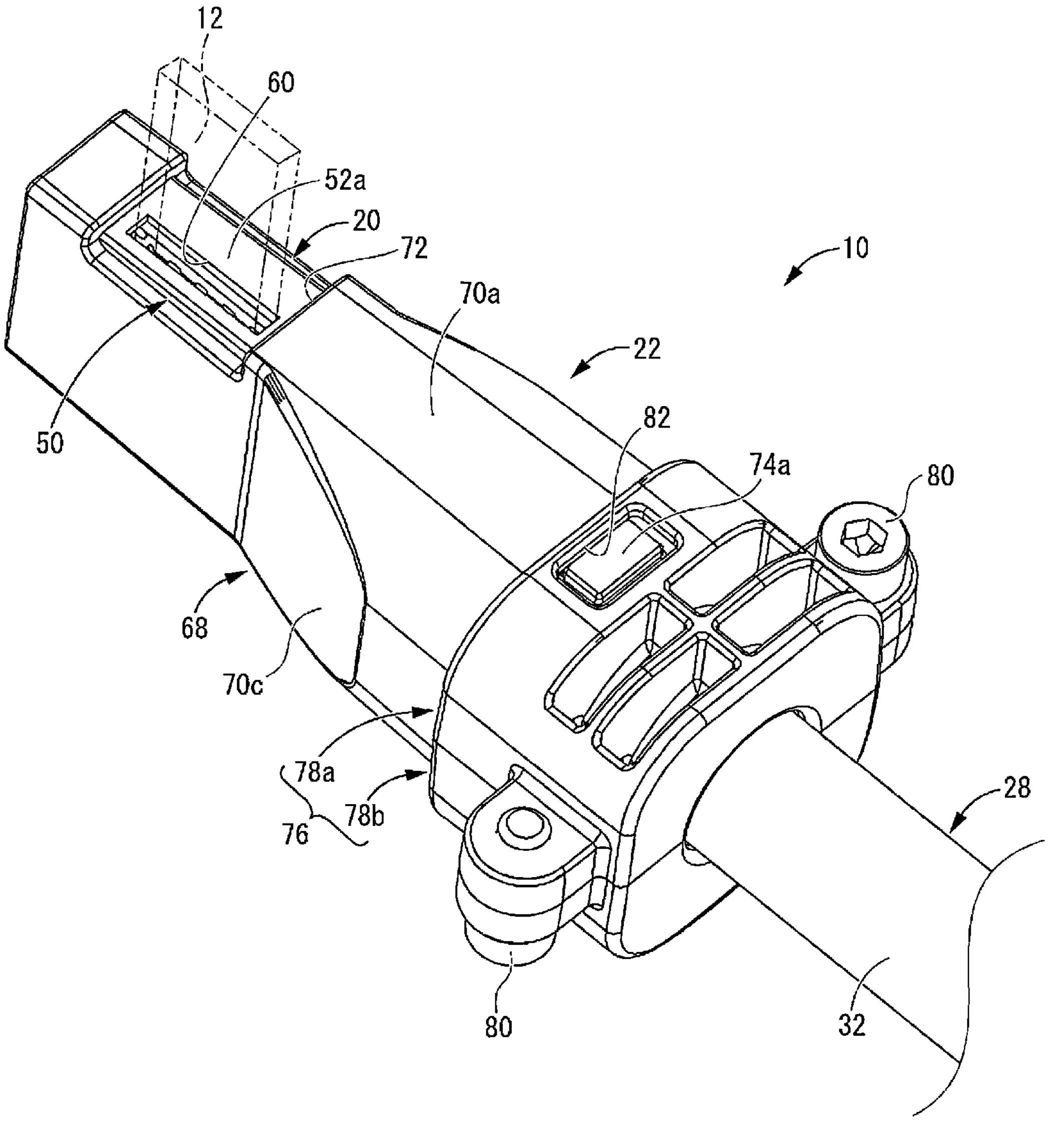
FIG. 1 is a perspective view of a shield connector according to a first embodiment.
Figure 2:
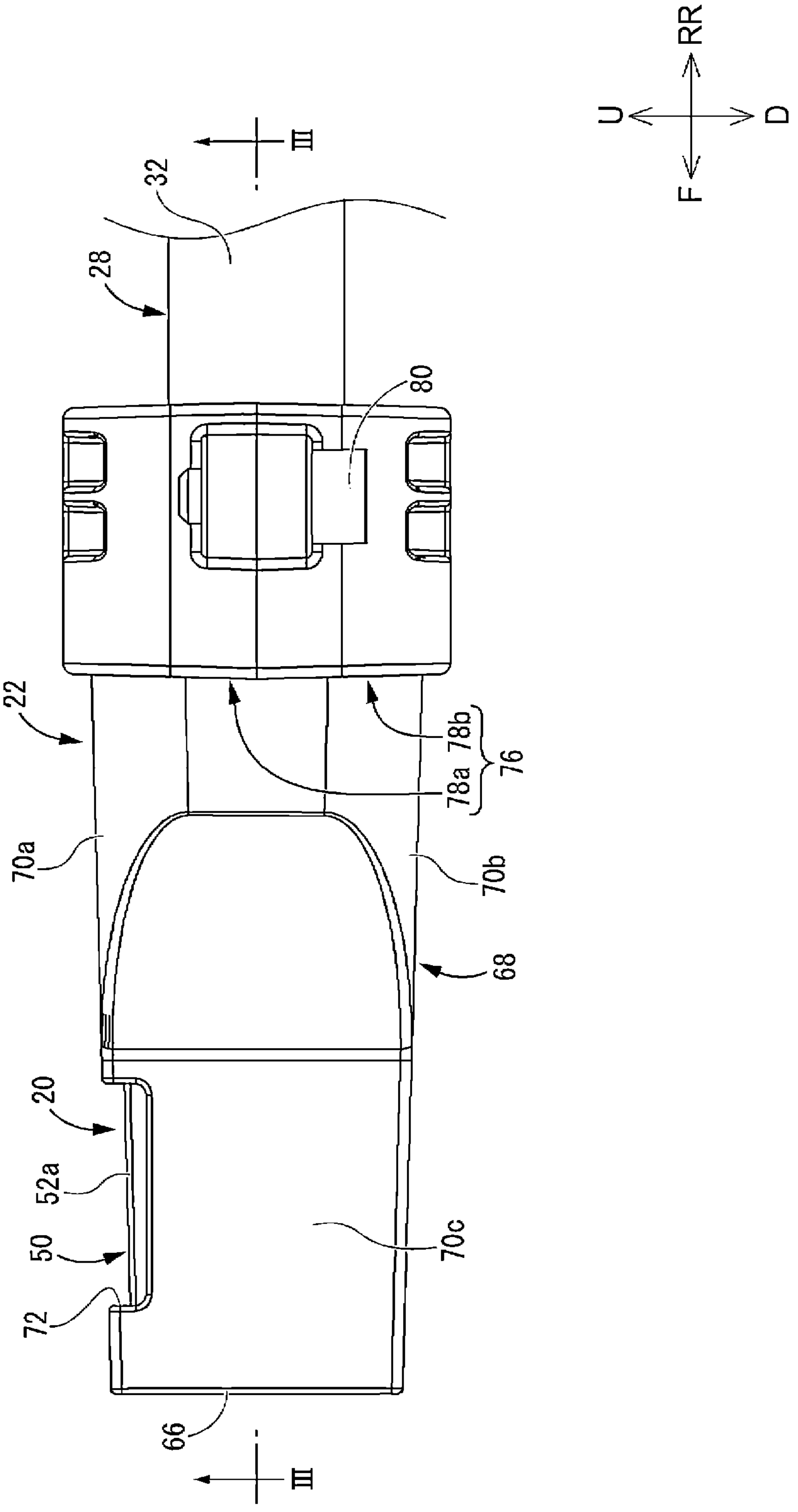
FIG. 2 is a right side view of the shield connector shown in FIG. 1.
Figure 3:
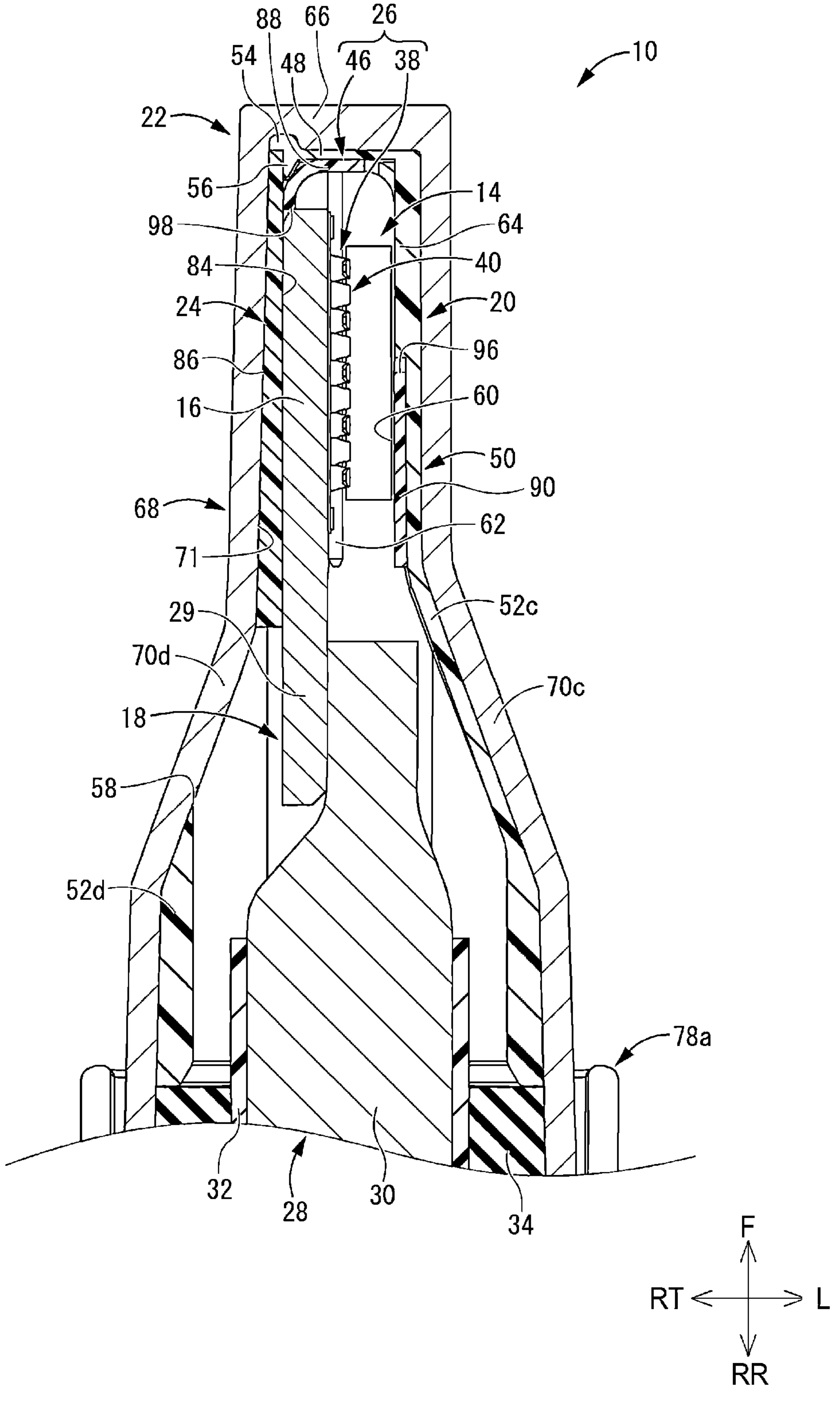
FIG. 3 is a vertical section along III-III in FIG. 2 showing an essential part.

First, embodiments of the present disclosure are listed and described.

(1) The shield connector of the present disclosure is provided with a terminal fitting including a mating terminal arrangement portion, a mating terminal being inserted into the mating terminal arrangement portion, and a terminal connecting portion to be connected to the mating terminal inserted and arranged in the mating terminal arrangement portion, an insulating housing for accommodating the terminal fitting, a shield shell for covering an outer surface of the housing, an insulating heat dissipating member having a connecting portion side contact surface to be held in contact with the terminal connecting portion and a shell side contact surface to be exposed from the housing and held in contact with the shield shell with the mating terminal arranged in the mating terminal arrangement portion, and a spring member for pressing the terminal connecting portion against the connecting portion side contact surface of the heat dissipating member and pressing the shell side contact surface of the heat dissipating member against the shield shell.

According to the shield connector of the present disclosure, the insulating heat dissipating member having the connecting portion side contact surface to be held in contact with the terminal connecting portion of the terminal fitting and the shell side contact surface to be exposed from the housing and held in contact with the shield shell is adopted instead of an insulating resin portion molded to fill a gap between a shield shell and a terminal fitting in a conventional structure. That is, since the separate heat dissipating member is used instead of the insulating resin portion molded in a heat dissipation path, a possibility of reducing desired heat dissipation performance due to the possible occurrence of a short shot or a void during molding can be reduced. Further, with the mating terminal arranged in the mating terminal arrangement portion, the terminal connecting portion is pressed against the connecting portion side contact surface of the heat dissipating member and the shell side contact surface of the heat dissipating member is pressed against the shield shell using the separate spring member. In this way, even if an environmental temperature changes during use, the heat dissipating member interposed between the terminal connecting portion and the shield shell can be stably held in contact with the terminal connecting portion and the shield shell utilizing a resilient force of the spring member. In addition, since the heat dissipating member is held in contact with the terminal connecting portion of the terminal fitting, the terminal connecting portion where heat is generated most in an electrically conductive path can be directly brought into contact with the shield shell via the heat dissipating member. As a result, the heat dissipation path can be made shorter than in the conventional structure and desired heat dissipation performance can be stably exhibited.

Note that any shape can be adopted for the spring member if the terminal connecting portion can be pressed against the connecting portion side contact surface of the heat dissipating member and the shell side contact surface of the heat dissipating member can be pressed against the shield shell with the mating terminal arranged in the mating terminal arrangement portion. Similarly, the terminal fitting including the terminal connecting portion, the shield shell and the heat dissipating member are also not particularly limited if the terminal connecting portion can be pressed against the connecting portion side contact surface of the heat dissipating member and the shell side contact surface of the heat dissipating member can be pressed against the shield shell by the spring member with the mating terminal arranged in the mating terminal arrangement portion.

(2) Preferably, the spring member includes a second spring member having a pair of second pressing portions for directly pressing parts of the connecting portion side contact surface of the heat dissipating member on both sides across a part held in contact with the terminal connecting portion. Since the spring member includes the second spring member including the pair of second pressing portions for directly pressing the connecting portion side contact surface of the heat dissipating member, the heat dissipating member can be more stably held in contact with the shield shell. Moreover, since the pair of second pressing portions directly press parts of the connecting portion side contact surface of the heat dissipating member on the both sides across the part held in contact with the terminal connecting portion, the heat dissipating member can be pressed against the shield shell by the second spring member without the second spring member being interposed between the terminal connecting portion and the heat dissipating member. As a result, both the shortening of the heat dissipation path and the prevention of formation of a gap and the like in the heat dissipation path can be achieved.

(3) Preferably, the second spring member is assembled with the housing, and the second spring member includes a curved portion, a base portion projecting from one circumferential end of the curved portion and the pair of second pressing portions projecting from the other circumferential end of the curved portion, and a distance between facing surfaces of the base portion and the second pressing portions of the second spring member increases with distance from the curved portion in a state before being assembled with the housing.

The distance between the facing surfaces of the base portion and the second pressing portions of the second spring member increases with distance from the curved portion in the state before being assembled with the housing. By assembling the second spring member with the housing, the base portion and the second pressing portions are resiliently deformed inward in a facing direction and the second spring member is stably assembled with the housing by resilient restoring forces of these. Particularly, since the second pressing portions of the second spring member press the heat dissipating member against the shield shell, the heat dissipating member is constantly pressed against the shield shell by assembling the second spring member with the housing, a gap is hardly formed between the heat dissipating member and the shield shell even upon an environmental temperature change or the like. As a result, a reduction in heat dissipation performance is stably prevented.

(4) Preferably, the housing includes an opening window, and the heat dissipating member is directly pressed toward the shield shell through the opening window. Since the heat dissipating member is directly pressed toward the shield shell through the opening window of the housing, the pressing of the heat dissipating member against the shield shell can be advantageously realized and heat dissipation is improved by making the heat dissipation path shorter while the terminal fitting and the terminal connecting portion accommodated in the housing are kept insulated.

(5) Preferably, the spring member includes a first spring member provided in the terminal connecting portion and having a first pressing portion, and the first pressing portion allows insertion of the mating terminal into the mating terminal arrangement portion by being pushed and resiliently deformed by the mating terminal being inserted into the mating terminal arrangement portion, and presses the terminal fitting against the connecting portion side contact surface of the heat dissipating member and presses the shell side contact surface of the heat dissipating member against the shield shell by a resilient restoring force of the first pressing portion.

The spring member includes the first spring member provided in the terminal connecting portion and having the first pressing portion, and the terminal connecting portion can be pressed against the shield shell via the heat dissipating member while the mating terminal and the terminal connecting portion are held in contact, utilizing a resilient restoring force of the first pressing portion. In this way, both conduction stability by ensuring a contact pressure between the mating terminal and the terminal connecting portion and a reduction in the thermal resistance of the heat dissipation path by stably holding the terminal connecting portion, the heat dissipating member and the shield shell in contact with each other can be achieved with a small number of components.

(6) Preferably, the terminal connecting portion and the heat dissipating member respectively have a flat plate shape and are arranged in parallel, one surface in a plate thickness direction of the heat dissipating member constitutes the connecting portion side contact surface and the other surface in the plate thickness direction of the heat dissipating member constitutes the shell side contact surface, and the other surface of the heat dissipating member is in contact with a contact flat surface of the shield shell extending in parallel to the other surface. The terminal connecting portion and the heat dissipating member having a flat plate shape and arranged in parallel to each other are overlapped, and the shell side contact surface constituted by the other surface in the plate thickness direction of the heat dissipating member is in contact with the shell side contact surface extending in parallel thereto. In this way, the terminal connecting portion and the heat dissipating member, and the heat dissipating member and the shield shell can be pressed and held in contact by ensuring wider contact areas. As a result, an improvement in heat dissipation and the prevention of formation of a gap and the like in the heat dissipation path can be advantageously realized.

(7) Preferably, the terminal connecting portion of the terminal fitting includes a tubular portion defining the mating terminal arrangement portion inside and a pair of flat plate-like portions projecting to an outer peripheral side of the tubular portion from a pair of circumferential end surfaces separated by a slit extending over an entire length in an axial direction of the tubular portion while being separated from each other, the spring member includes a third pressing portion for overlapping the pair of flat plate-like portions and pressing the pair of flat plate-like portions against the connecting portion side contact surface of the heat dissipating member, and the columnar mating terminal is allowed to be press-fit into the mating terminal arrangement portion by enlarging a diameter of the tubular portion, the pair of flat plate-like portions are pressed against the connecting portion side contact surface of the heat dissipating member and the shell side contact surface of the heat dissipating member is pressed against the shield shell by a pressing force of the third pressing portion while the tubular portion is pressed into contact with the mating terminal.

If the mating terminal has a columnar shape such as a cylindrical shape, the terminal connecting portion of the terminal fitting includes the tubular portion and the mating terminal arrangement portion is defined inside the tubular portion. The pair of flat plate-like portions are provided which project to the outer peripheral side from the pair of circumferential end surfaces separated by the slit provided in the tubular portion, and the spring member is provided with the third pressing portion for pressing the pair of flat plate-like portions in an overlapping direction. The columnar mating terminal is allowed to be press-fit into the tubular portion by enlarging the diameter of the tubular portion due to displacements of the pair of flat plate-like portions against the pressing force of the third pressing portion, and the inner surface of the tubular portion is pressed in contact with the outer peripheral surface of the mating terminal by a resilient restoring force of the tubular portion in a diameter reducing direction after the press-fit. Such a state is stably held by the pressing force of the third pressing portion to the pair of flat plate-like portions. Further, the third pressing portion also has a function of pressing the pair of flat plate-like portions in the overlapped state against the connecting portion side contact surface of the heat dissipating member and pressing the shell side contact surface of the heat dissipating member against the shield shell. Therefore, both conduction stability by ensuring a contact pressure between the mating terminal and the terminal connecting portion and a reduction in the thermal resistance of the heat dissipation path by stably holding the terminal connecting portion, the heat dissipating member and the shield shell in contact with each other can be achieved with a small number of components.

Note that the third pressing portion of the spring member may be provided in a spring member (e.g. third spring member) separate from the second spring member or may be integrally provided to the second spring member as described later.

(8) Preferably, the third pressing portion is constituted by a free end part projecting toward the second pressing portions by folding a projecting end part of the base portion toward the curved portion, and integrally provided to the second spring member. The third pressing portion can be integrally provided to the second spring member utilizing the second spring member by a simple structure of only causing the projecting end part of the base portion of the second spring member to be folded toward the curved portion and project toward the second pressing portion. Thus, both a function of pressing the terminal connecting portion against the heat dissipating member and further pressing the heat dissipating member against the shield shell and a function of ensuring a contact pressure with the mating terminal of the terminal connecting portion can be realized by the single second spring member, and a further reduction in the number of components, the simplification and miniaturization of the structure can be further advantageously achieved.

(9) Preferably, the projecting end part of the base portion further projects toward the base portion via a bent portion after projecting toward the second pressing portions, and the bent portion is in contact with the flat plate-like portion. The third pressing portion integrally provided to the second spring member is provided by causing the projecting end part of the base portion to project toward the base portion via the bent portion after projecting toward the second pressing portions, whereby the third pressing portion can be advantageously resiliently deformed toward the base portion. In this way, displacements of the pair of flat plate-like portions against the pressing force by the third pressing portion can be easily allowed, and a press-fit force of the mating terminal into the tubular portion can be reduced.

(10) Preferably, the terminal fitting is formed using a strip-like flat metal plate, a wire connecting portion to be connected to a core wire of an external coated wire is formed in one end part of the flat metal plate, one of the pair of flat plate-like portions is constituted by a part connected to the wire connecting portion, a part connected to the one flat plate-like portion is bent into a tube shape to form the tubular portion, and the other of the pair of flat plate-like portions is constituted by a part connected to the tubular portion and the other flat plate-like portion is overlapped on the one flat plate-like portion. The terminal fitting including the pair of flat plate-like portions and the tubular portion can be formed by a simple structure of only bending the strip-like flat metal plate into a tube shape substantially in the intermediate part, and the structure can be simplified and reduced in cost. Particularly, since the wire connecting portion, the pair of flat plate-like portions and the tubular portion can be compactly arranged on the same line by folding the strip-like flat metal plate, the miniaturization of the terminal fitting and that of the entire shield connection can also be advantageously achieved.

Details of Embodiments of Present Disclosure

Specific examples of a shield connector of the present disclosure are described below with reference to the drawings. Note that the present disclosure is not limited to these illustrations, but is represented by claims and intended to include all changes in the scope of claims and in the meaning and scope of equivalents.

First Embodiment

Hereinafter, a shield connector 10 of a first embodiment of the present disclosure is described with reference to FIGS. 1 to 10. This shield connector 10 is applied, for example, to an electric vehicle or a hybrid vehicle and used in a large current region of a high-voltage connector from a PCU to a battery. Note that the shield connector 10 can be arranged in an arbitrary orientation, but upper and lower sides are upper and lower sides in FIG. 2, front and rear sides are left and right sides in FIG. 2 and left and right sides are a frontal side in a direction orthogonal to the plane of FIG. 2 (right side in FIG. 3) and a back side in the direction orthogonal to the plane of FIG. 2 (left side in FIG. 3). Further, for a plurality of identical members, only some members may be denoted by a reference sign and the others may not be denoted by the reference sign.

(Shield Connector 10)

The shield connector 10 is provided with a terminal fitting 18 including a mating terminal arrangement portion 14, into which a mating terminal 12 is inserted, and a terminal connecting portion 16 to be connected to the mating terminal 12 inserted and arranged in the mating terminal arrangement portion 14. The terminal fitting 18 is accommodated in an insulating housing 20 and the outer surface of the housing 20 is covered by a shield shell 22. Further, the shield connector 10 is provided with an insulating heat dissipating member 24 to be held in contact with the terminal connecting portion 16 inside the housing 20 and exposed on the outer surface of the housing 20 and to be held in contact with the shield shell 22. That is, the heat dissipating member 24 has a later-described connecting portion side contact surface 84 to be held in contact with the terminal connecting portion 16 and a later-described shell side contact surface 86 to be held in contact with the shield shell 22. Furthermore, the shield connector 10 is provided with a spring member 26 for pressing the terminal connecting portion 16 against the connecting portion side contact surface 84 of the heat dissipating member 24 and pressing the shell side contact surface 86 of the heat dissipating member 24 against the shield shell 22 with the mating terminal 12 arranged in the mating terminal arrangement portion 14.

(Mating Terminal 12)

The shape of the mating terminal 12 is not limited, but is a substantially flat tab shape in this embodiment. Note that, in this embodiment, the mating terminal arrangement portion 14 is provided inside the shield connector 10 as described later, and the mating terminal 12 is inserted into a mating terminal insertion hole 60 provided in the housing 20. The mating terminal 12 arranged in the mating terminal arrangement portion 14 and the terminal connecting portion 16 of the terminal fitting 18 accommodated in the housing 20 are brought into contact to become conductive. That is, in this embodiment, the mating terminal 12 is a male terminal and the terminal connecting portion 16 is a female terminal.

(Terminal Fitting 18)

Figure 4:
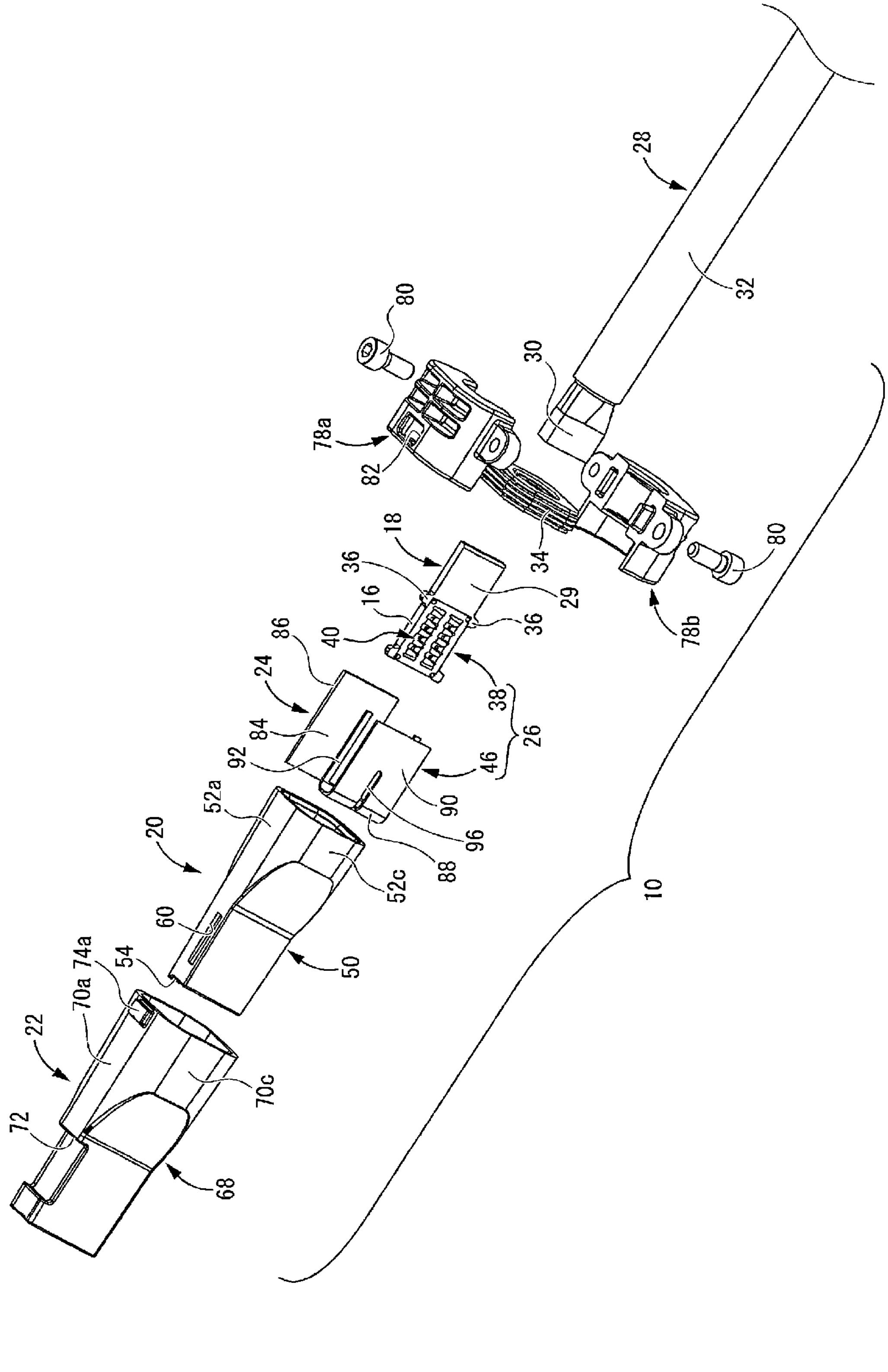
FIG. 4 is an exploded perspective view of the shield connector shown in FIG. 1.
Figure 5:
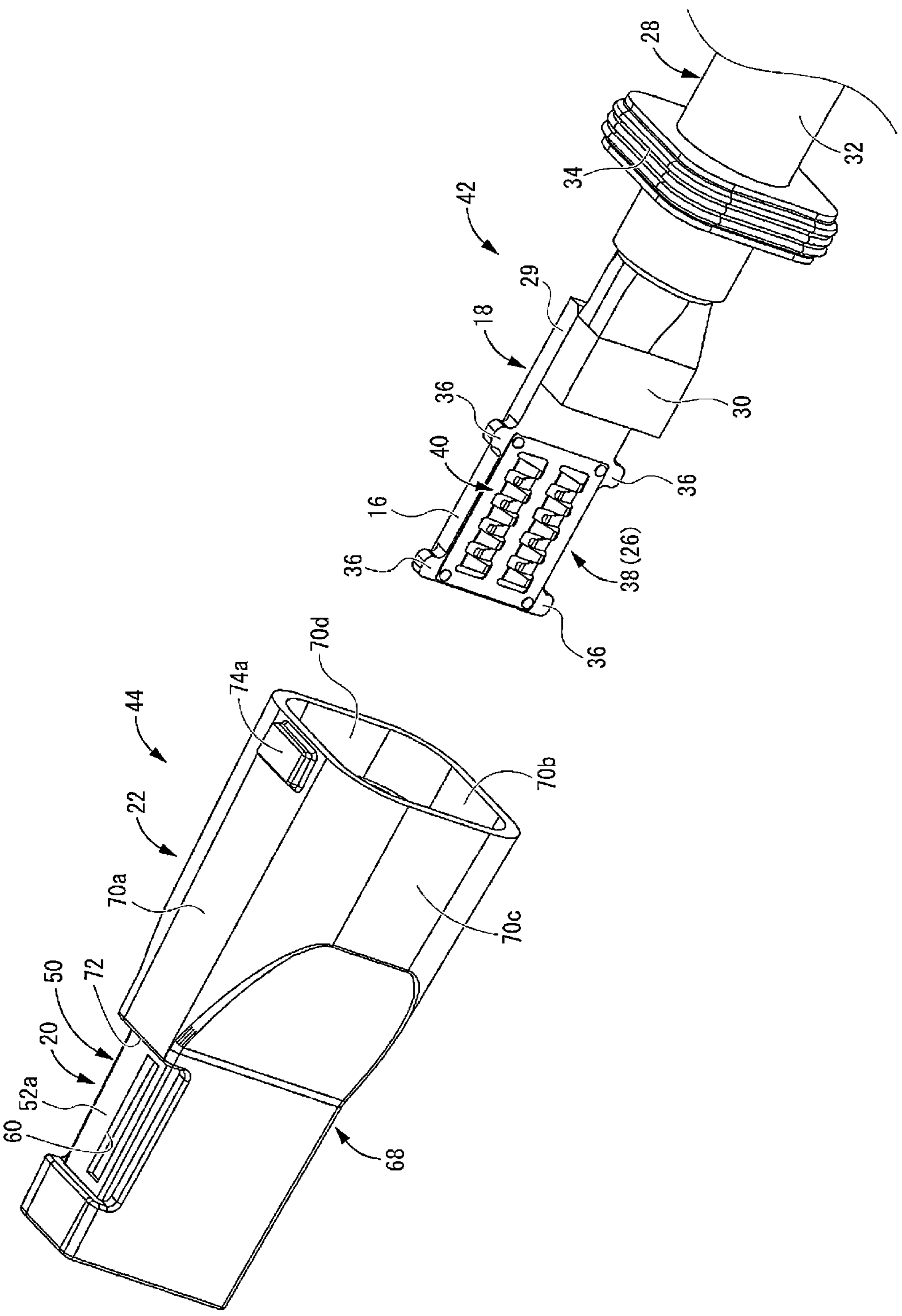
FIG. 5 is a view showing an intermediate state of an assembly process of the shield connector shown in FIG. 1 in a state before an assembly on a terminal fitting side is inserted into an assembly on a shield shell side.
Figure 6:
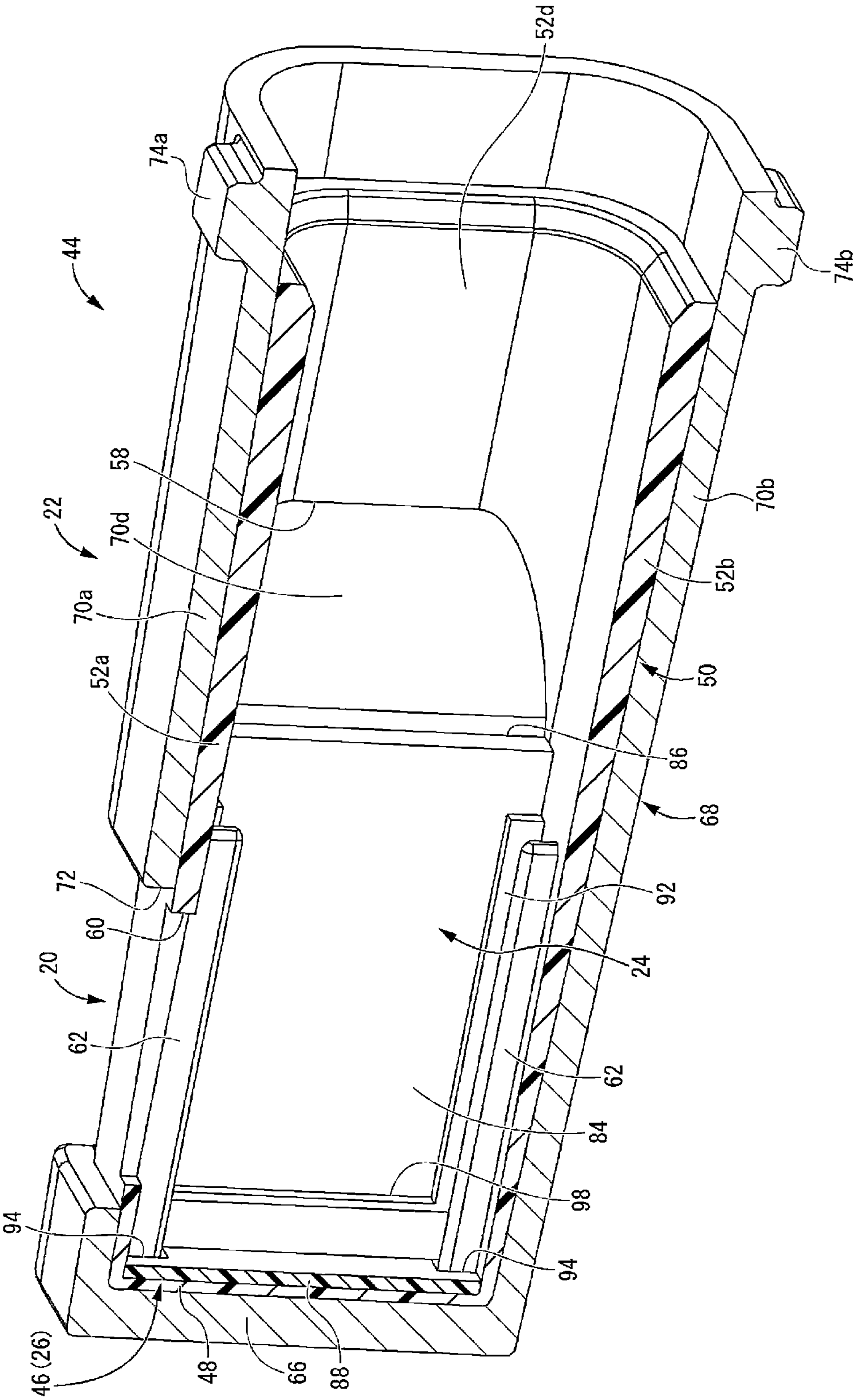
FIG. 6 is a perspective view in vertical section showing the assembly on the shield shell side shown in FIG. 5.

As also shown in FIGS. 4 and 5, the terminal fitting 18 including the terminal connecting portion 16 is substantially in the form of a flat plate as a whole and has a substantially rectangular shape extending in a front-rear direction. A front part of this terminal fitting 18 is the terminal connecting portion 16, and a wire 28 is fixed to a rear end part of the terminal fitting 18. This rear end part of the terminal fitting 18 is a wire connecting portion 29. The wire 28 is a coated wire, and an insulation coating 32 made of synthetic resin is externally fit to a core wire 30. The insulation coating 32 is stripped to expose the core wire 30 in a tip part of the wire 28, and the wire 28 and the terminal fitting 18 are made conductive by fixing the exposed core wire 30 to the rear end part (wire connecting portion 29) of the terminal fitting 18 by crimping, welding or the like. Note that an annular waterproof rubber 34 having a substantially rectangular outer shape is externally fit and mounted on a part of the wire 28 behind the exposed core wire 30.

Further, positioning projections 36 projecting vertically outward are provided on both vertical sides in both end parts in the front-rear direction of the terminal connecting portion 16. A lateral dimension of each positioning projection 36 is smaller than that of the terminal connecting portion 16. In this embodiment, the left end surface of the terminal connecting portion 16 and that of each positioning projection 36 extend on the same plane. In short, each positioning projection 36 is deviated leftward in a lateral direction of the terminal connecting portion 16.

(First Spring Member 38)

A first spring member 38 constituting the spring member 26 is provided on the left end surface of the terminal connecting portion 16. The first spring member 38 is substantially in the form of a rectangular plate as a whole, made of metal good in electrical conductivity and fixed to the left end surface of the terminal connecting portion 16. Parts cut and raised into a substantially chevron shape project leftward from the first spring member 38, and resiliently deformable to reduce a projecting height. A plurality of the parts cut and raised into a substantially chevron shape are provided, and aligned and arranged in the vertical direction and front-rear direction. When the mating terminal 12 is inserted and arranged in the mating terminal arrangement portion 14, a first pressing portion 40 to be pressed between the mating terminal 12 and the terminal connecting portion 16 is constituted by the plurality of these parts cut and raised into a substantially chevron shape.

As just described, a terminal fitting side assembly 42 is configured as shown on a right side of FIG. 5 by fixing the wire 28 having the waterproof rubber 34 mounted thereon to the rear end part of the terminal fitting 18 and fixing the first spring member 38 to the left end surface of the terminal connecting portion 16, which is the front part of the terminal fitting 18. This terminal fitting side assembly 42 is assembled with a shield shell side assembly 44 shown on a left side of FIG. 5 and FIG. 6. The shield shell side assembly 44 includes the housing 20, the shield shell 22, the heat dissipating member 24 and a second spring member 46 constituting the spring member 26. Each member constituting the shield shell side assembly 44 is described below.

(Housing 20)

Figure 7:
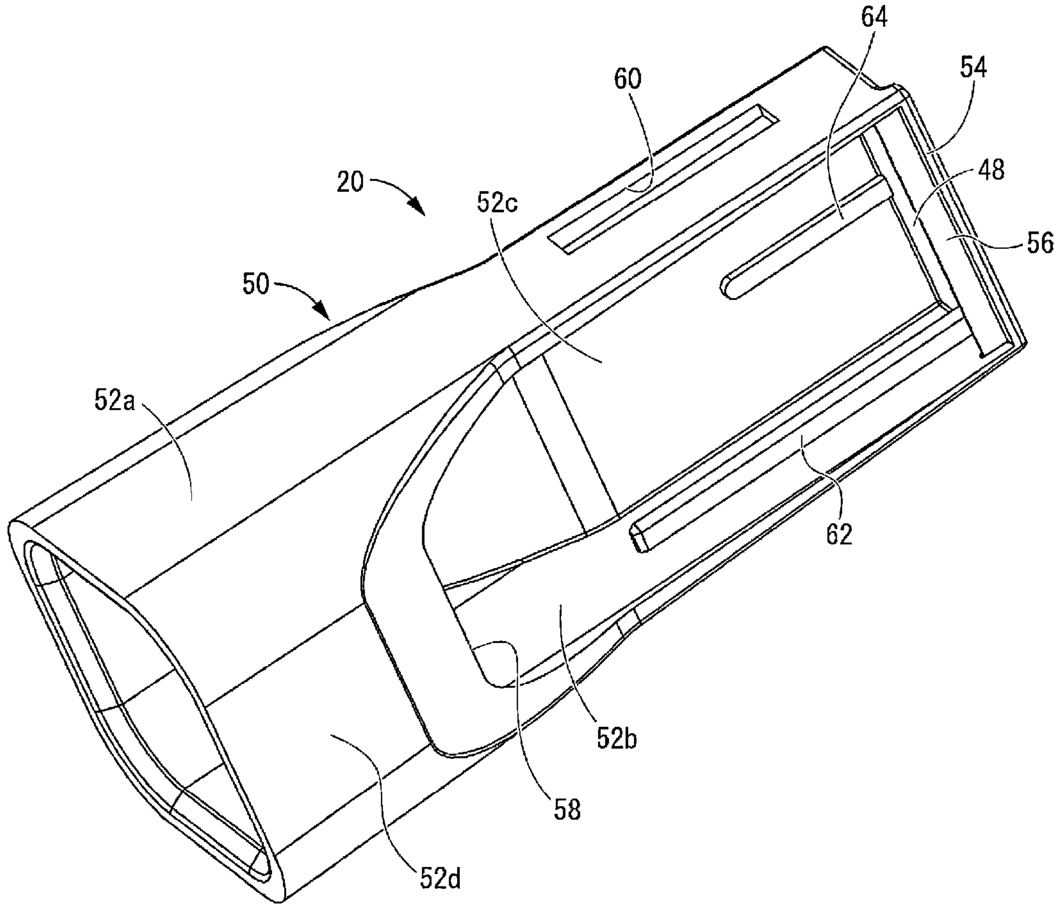
FIG. 7 is a perspective view showing a housing constituting the shield connector shown in FIG. 1.

As also shown in FIG. 7, the housing 20 has a substantially bottomed tube shape open rearward as a whole and made of insulting synthetic resin. Note that a formation method of the housing 20 is not limited, but the housing 20 is formed by molding, formed separately from the shield shell 22 and assembled with the shield shell 22 later in this embodiment.

The housing 20 is provided with a substantially rectangular front wall portion 48 equivalent to a bottom wall in a front end part and a substantially tubular peripheral wall portion 50 projecting rearward from a peripheral edge part on four sides of the front wall portion 48. Accordingly, the peripheral wall portion 50 is provided with an upper wall portion 52*a* on an upper side, a lower wall portion 52*b* on a lower side and left and right wall portions 52*c*, 52*d* on both left and right sides. The outer shape of the peripheral wall portion 50 is different in the front-rear direction, and a front part of the peripheral wall portion 50 has a substantially rectangular shape having a vertical dimension larger than a lateral dimension. The left and right wall portions 52*c*, 52*d* are provided with parts inclined to gradually expand laterally outward toward a rear side, whereby a rear end part of the peripheral wall portion 50 has a substantially square outer shape. That is, an internal space of the housing 20 is larger in a rear part than in a front part.

Note that a front protrusion 54 projecting forward is provided on a right end part of the front wall portion 48. Further, at the formation position of the front protrusion 54, a supporting protrusion 56 projecting rearward is provided inwardly of a right end part of the rear surface of the front wall portion 48. An opening window 58 cut from a front end part to an intermediate part in the front-rear direction is formed in the right wall portion 52*d* including the front protrusion 54. Specifically, a front end part of the opening window 58 is located forward of the rear surface of a part of the front wall portion 48 where the front protrusion 54 is not provided, and a rear end part of the opening window 58 reaches an intermediate position of a part inclined rightward toward the rear side in the right wall portion 52*d*. In this way, an internal space and an external space of the housing 20 communicate with each other through the opening window 58 in the right wall portion 52*d*.

Further, a front part of the upper wall portion 52*a* of the housing 20 is provided with the substantially rectangular mating terminal insertion hole 60 penetrating in a thickness direction (vertical direction). Further, positioning ribs 62, 62 are provided over a predetermined length from front ends in lateral central parts of front parts of the inner surfaces of the upper and lower wall portions 52*a*, 52*b*. Furthermore, a positioning rib 64 is provided over a predetermined length from a front end in a vertical central part of a front part of the inner surface of the left wall portion 52*c*.

(Shield Shell 22)

The shield shell 22 is made of metal excellent in heat dissipation. The overall outer shape of the shield shell 22 is substantially similar to that of the housing 20, and is a substantially bottomed tube shape open rearward. That is, the shield shell 22 is provided with a substantially rectangular front end wall portion 66 and a tubular wall portion 68 projecting rearward from a peripheral edge part on four sides of the front end wall portion 66. Therefore, the tubular wall portion 68 includes an upper end wall portion 70*a* on an upper side, a lower end wall portion 70*b* on a lower side and left and right end wall portions 70*c*, 70*d* on both left and right sides. Further, the outer shape of the shield shell 22 is different in the front-rear direction, similarly to the housing 20, and a front part of the shield shell 22 has a substantially rectangular shape having a vertical dimension larger than a lateral dimension. The left and right end wall portions 70*c*, 70*d* are provided with parts inclined to gradually expand outward in the lateral direction toward the rear side, whereby a rear end part of the tubular wall portion 68 has a substantially square outer shape. That is, also in the shield shell 22, an internal space is larger in a rear part than in a front part.

Particularly, the shield shell 22 is formed in a size capable of accommodating the housing 20 and, in accommodating the housing 20 into the shield shell 22, the inner surface of the shield shell 22 and the outer surface of the housing 20 are held substantially in close contact. Note that, as described later, the inner surface of the right end wall portion 70*d* of the shield shell 22 serves as a contact flat surface 71 extending in parallel to the other surface (shell side contact surface 86) of the heat dissipating member 24 in a plate thickness direction. At the time of assembling the shield connector 10, the shell side contact surface 86 of the heat dissipating member 24 entirely contacts the contact flat surface 71.

Note that a through window 72 penetrating in the thickness direction is formed in a front part of the upper end wall portion 70*a* of the shield shell 22, and the internal space and the external space of the shield shell 22 communicate with each other through the through window 72. This through window 72 is formed at a position corresponding to the mating terminal insertion hole 60 in the housing 20 and, in this embodiment, has a dimension in the front-rear direction longer than that of the mating terminal insertion hole 60 and is formed over an entire length in the lateral direction of the upper end wall portion 70*a*. In this way, when the housing 20 is assembled with the shield shell 22 by being accommodated thereinto, a part around the mating terminal insertion hole 60 in the upper wall portion 52*a* of the housing 20 is exposed to outside through the through window 72 of the upper end wall portion 70*a*.

Further, when the housing 20 is assembled with the shield shell 22 by being accommodated thereinto, the rear end position of the shield shell 22 is located behind the housing 20. In a rear end part of the shield shell 22, the upper and lower end wall portions 70*a*, 70*b* are respectively provided with positioning protrusions 74*a*, 74*b* projecting outward in the vertical direction.

Further, the waterproof rubber 34 externally fit on the wire 20 is fit into the internal space in the rear end part of the shield shell 22, and a retainer 76 for preventing the detachment of the waterproof rubber 34 from the shield shell 22 is provided in the rear end part of the shield shell 22. In this embodiment, the retainer 76 is dividable in the vertical direction and composed of an upper retainer 78*a* and a lower retainer 78*b*. The upper and lower retainers 78*a*, 78*b* cover the rear end part of the shield shell 22 from vertically outer sides, and are fixed by a bolt 80, whereby the retainer 76 is assembled with the rear end part of the shield shell 22. Note that the upper and lower retainers 78*a*, 78*b* are respectively provided with positioning holes 82 corresponding to the positioning protrusions 74*a*, 74*b* provided on the upper and lower end wall portions 70*a*, 70*b* of the shield shell 22. In assembling the upper and lower retainers 78*a*, 78*b* with the shield shell 22, the positioning protrusions 74*a*, 74*b* are inserted into the positioning holes 82, whereby the shield shell 22 and the upper and lower retainers 78*a*, 78*b* are aligned with each other.

(Heat Dissipating Member 24)

The shape and material of the heat dissipating member 24 are not limited if the heat dissipating member 24 has an insulating property, but the heat dissipating member 24 has a substantially flat plate shape in this embodiment. Further, the heat dissipating member 24 may have a larger thermal conductivity than air, but is preferably excellent in thermal conductivity. In this embodiment, the heat dissipating member 24 is made of ceramic. This heat dissipating member 24 is assembled to cover a front part of the opening window 58 in the housing 20 accommodated in the shield shell 22. Particularly, when being assembled, the heat dissipating member 24 is inserted between the supporting protrusion 56 and the right end wall portion 70*d* of the shield shell 22 facing each other in the lateral direction, and the front end position of the heat dissipating member 24 is specified by the contact of the heat dissipating member 24 with the front protrusion 54 provided on the housing 20.

At the time of assembling the shield connector 10, one surface (left end surface in this embodiment) in the plate thickness direction of the heat dissipating member 24 contacts the terminal connecting portion 16, and the connecting portion side contact surface 84 is constituted by the one surface in the plate thickness direction of the heat dissipating member 24. Further, the other surface (right end surface in this embodiment) in the plate thickness direction of the heat dissipating member 24 is exposed on the outer surface of the housing 2 through the opening window 58 of the housing 20 and contacts the shield shell 22 covering the outer surface of the housing 20. That is, the shell side contact surface 86 is constituted by the other surface in the plate thickness direction of the heat dissipating member 24. Particularly, in this embodiment, the contact flat surface 71, which is the inner surface of the right end wall portion 70*d* of the shield shell 22 and contacts the shell side contact surface 86, extends in parallel to the shell side contact surface 86, and the shell side contact surface 86 entirely contacts the contact flat surface 71.

Note that, in this embodiment, the both side surfaces in the plate thickness direction (connecting portion side contact surface 84 and shell side contact surface 86) of the heat dissipating member 24 are inclined to each other, and the heat dissipating member 24 is formed to gradually increase a plate thickness toward the rear side.

(Second Spring Member 46)

Figure 8:
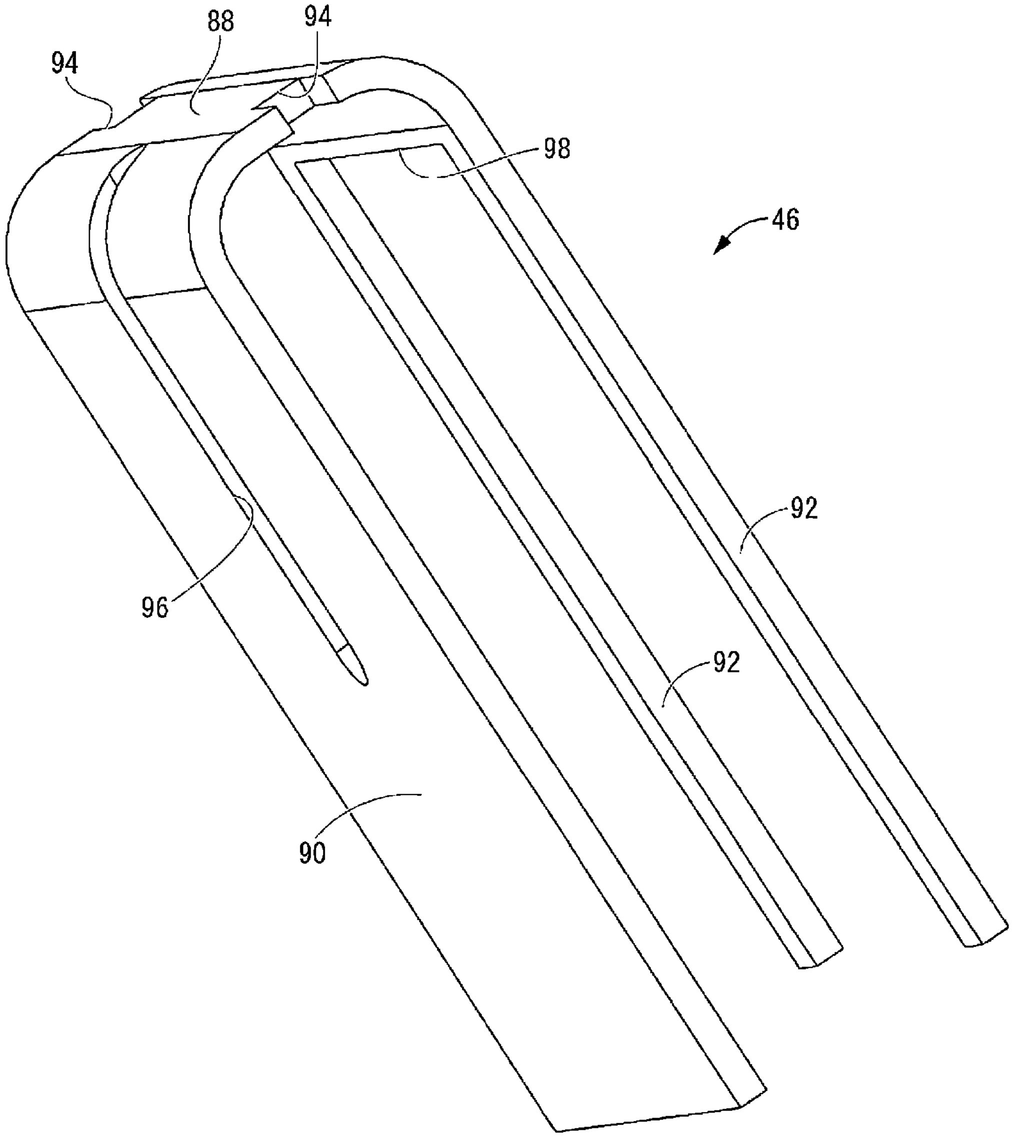
FIG. 8 is a perspective view showing a state where a second spring member constituting the shield connector shown in FIG. 1 is assembled with the housing.

The second spring member 46 is, for example, made of insulating synthetic resin and, as also shown in FIG. 8, provided with a curved portion 88 extending in the lateral direction in a front end part. Further, a base portion 90 projecting rearward is provided on one circumferential end (left end) of the curved portion 88, and a pair of second pressing portions 92, 92 projecting rearward are provided on the other circumferential end (right end) of the curved portion 88. In this way, the base portion 90 and the pair of second pressing portions 92, 92 are facing each other in the lateral direction. Each of the curved portion 88, the base portion 90 and the pair of second pressing portions 92, 92 has a substantially constant thickness, and each of the base portion 90 and the pair of second pressing portions 92, 92 has a substantially equal dimension in the front-rear direction. The base portion 90 and the pair of second pressing portions 92, 92 are resiliently deformable in the lateral direction with respect to the curved portion 88.

Note that, in FIG. 8, the second spring member 46 is shown in a state assembled with the housing 20 and the base portion 90 and the pair of second pressing portions 92, 92 respectively extend in the front-rear direction substantially in parallel to each other. However, in a state before being assembled with the housing 20, a distance (lateral distance) between facing surfaces of the base portion 90 and the second pressing portions 92 gradually increases with distance from the curved portion 88. That is, by assembling the second spring member 46 with the housing 20, the base portion 90 and the pair of second pressing portions 92, 92 are pressed inwardly in a facing direction. Resilient restoring forces of the base portion 90 and the pair of second pressing portions 92, 92 are applied as lateral outward biasing forces to the left wall portion 52*c* and the heat dissipating member 24 located outward of the base portion 90 and the pair of second pressing portions 92, 92 in the lateral direction at the time of assembling.

The curved portion 88 may be curved over an entire length in a length direction or may be curved partially in the length direction. In this embodiment, a lateral central part of the curved portion 88 has a substantially flat plate shape and both end parts in the lateral direction of the curved portion 88 are gradually curved rearward as extending outward in the lateral direction. Even if the curved portion 88 is curved over the entire length in the length direction or even if the curved portion 88 is curved partially in the length direction, a curvature of a curved part may be substantially constant over the entire length or may vary in the length direction. Particularly, in this embodiment, a pair of positioning recesses 94, 94 open outward in the vertical direction are formed on both vertical sides in the lateral central part of the curved portion 88 having a substantially flat plate shape.

Further, a positioning groove 96 penetrating in a thickness direction is provided in a vertical central part from a left end part of the curved portion 88 to the base portion 90. Specifically, the positioning groove 96 is formed from the left curved part in the curved portion 88 to a substantially central part in the front-rear direction of the base portion 90.

Further, the pair of second pressing portions 92, 92 extending rearward from the right curved part in the curved portion 88 are provided on both upper and lower ends of the other circumferential end (right end) of the curved portion 88, and a substantially rectangular region surrounded by the pair of second pressing portions 92, 92 and the curved portion 88 serves as an accommodation region 98 for accommodating the terminal connecting portion 16 at the time of assembling the shield connector 10 as described later.

(Assembly Process of Shield Connector 10)

Next, a specific example of an assembly process of the shield connector 10 is described. Note that the assembly process of the shield connector 10 is not limited to the one described below.

First, the first spring member 38 is fixed to the left end surface of the terminal connecting portion 16, which is the front part of the terminal fitting 18, and the wire 28 is fixed to the wire connecting portion 29, which is the rear end part of the terminal fitting 18. Then, the waterproof rubber 34 is externally fit and mounted on the wire 28, thereby completing the terminal fitting side assembly 42.

Further, the shield shell 22, the housing 20, the heat dissipating member 24 and the second spring member 46 are respectively separately formed and prepared. Thereafter, the housing 20 is accommodated into the shield shell 22 by being inserted through a rear opening of the shield shell 22. Subsequently, the heat dissipating member 24 is inserted through the rear opening of the housing 20 and inserted between the right end wall portion 70*d* of the shield shell 22 and the supporting protrusion 56 of the housing 20 through the opening window 58 to bring a front end part of the heat dissipating member 24 into contact with the front protrusion 54 of the housing 20. In this way, the shell side contact surface 86 of the heat dissipating member 24 is exposed on the outer surface of the housing 20 through the opening window 58 and brought into contact with the contact flat surface 71, which is the inner surface of the right end wall portion 70*d* of the shield shell 22. Then, the second spring member 46 is inserted through the rear opening of the housing 20 and arranged in a region surrounded by the housing 20 and the heat dissipating member 24. In this way, the shield shell side assembly 44 is completed.

In inserting the second spring member 46 into the housing 20, the positioning ribs 62, 62 projecting on both upper and lower sides of the inner surface of the housing 20 are inserted into the positioning recesses 94, 94 in the second spring member 46, and the positioning rib 64 projecting on the left side of the inner surface of the housing 20 is inserted into the positioning groove 96 in the second spring member 46. In this way, the housing 20 and the second spring member 46 are aligned with each other.

Further, by arranging the second spring member 46 between the housing 20 and the heat dissipating member 24, the base portion 90 is overlapped on the left wall portion 52*c* of the housing 20 from inside and the pair of second pressing portions 92, 92 are overlapped on the heat dissipating member 24 from inside. In this way, the base portion 90 and the pair of second pressing portions 92, 92 are respectively pressed inward in the facing direction by the left wall portion 52*c* and the heat dissipating member 24 and resiliently deformed to become parallel to each other from a state gradually spaced apart toward the rear side. By resilient restoring forces of the base portion 90 and the pair of second pressing portions 92, 92, lateral outward biasing forces are applied to the left wall portion 52*c* and the heat dissipating member 24. In short, the left wall portion 52*c* is pressed against the left end wall portion 70*c* of the shield shell 22 by the base portion 90 and the heat dissipating member 24 is directly pressed against the right end wall portion 70*d* of the shield shell 22 through the opening window 58 by the pair of second pressing portions 92, 92. Specifically, the pair of second pressing portions 92, 92 directly press the connecting portion side contact surface 84 of the heat dissipating member 24 on both sides across the accommodation region 98 for accommodating the terminal connecting portion 16. That is, at the time of assembling the shield connector 10, the pair of second pressing portions 92, 92 directly press the connecting portion side contact surface 84 of the heat dissipating member 24 on both sides across a part held in contact with the terminal connecting portion 16 on the connecting portion side contact surface 84.

Figure 9:
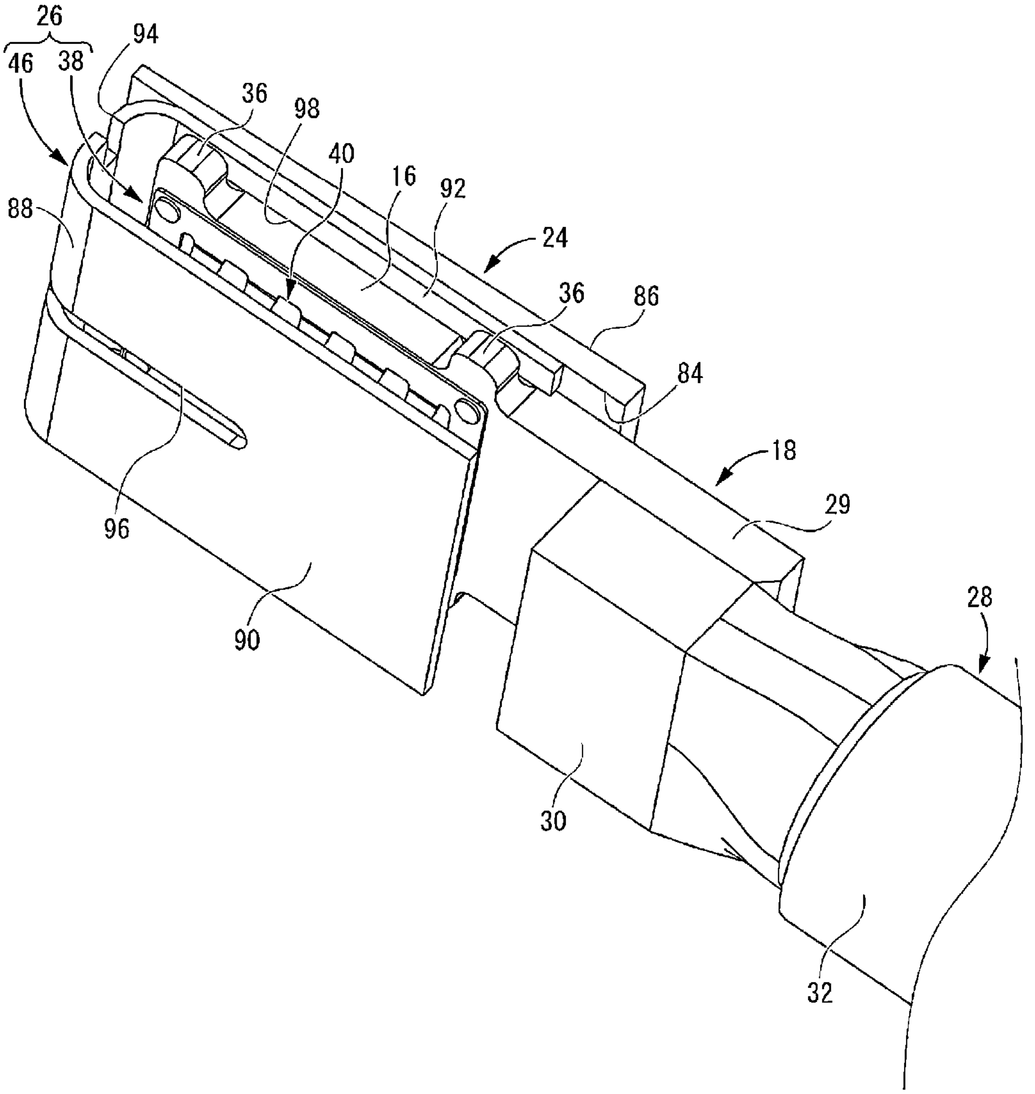
FIG. 9 is a perspective view showing an essential part of the shield connector shown in FIG. 1.

Thereafter, the completed terminal fitting side assembly 42 and shield shell side assembly 44 are opposed to each other in the front-rear direction as shown in FIG. 5, and the terminal fitting side assembly 42 is inserted into an internal space of the shield shell side assembly 44. In this way, as also shown in FIG. 9, the terminal connecting portion 16 is accommodated into the accommodation region 98 provided between the pair of second pressing portions 92, 92. Then, the terminal connecting portion 16 is brought into contact with the connecting portion side contact surface 84 of the heat dissipating member 24 between the pair of second peripheral surface 92, 92. Further, the pair of second pressing portions 92, 92 are inserted between the positioning projections 36 projecting vertically outward on the left side of the terminal connecting portion 16 and the heat dissipating member 24 in the lateral direction. Along with that, the positioning projections 36 projecting vertically outward from the terminal connecting portion 16 are inserted between the positioning ribs 62, 62 provided in the housing 20 and the pair of second pressing portions 92, 92 in the second spring member 46 in the lateral direction. This insertion of the terminal fitting side assembly 42 into the shield shell side assembly 44 is limited, for example, by the contact of the terminal connecting portion 16 with a wall portion constituting the front end of the accommodation region 98 or the like. Note that FIG. 9 shows only an essential part of the shield connector 10 to facilitate understanding. Specifically, the shield shell 22 and the housing 20 are not shown.

Further, according to the insertion of the terminal fitting side assembly 42 into the shield shell side assembly 44, the waterproof rubber 34 is press-fit into the rear end part of the shield shell 22 to seal the rear opening of the shield shell 22 liquid-tight. Thereafter, the upper and lower retainers 78*a*, 78*b* are assembled with the rear end part of the shield shell 22 from both upper and lower sides and fixed by the bolt 80. In this way, the retainer 76 is fixed to the rear end part of the shield shell 22 to complete the shield connector 10.

In an assembled state of the shield connector 10, the first pressing portion 40 of the first spring member 38 provided in the terminal connecting portion 16 is provided substantially at the same position as the mating terminal insertion hole 60 provided in the housing 20 in the front-rear direction. In this embodiment, in a plan view (projection in the vertical direction), a leftward projecting end part of the first pressing portion 40 is arranged to slightly project into the mating terminal insertion hole 60. Note that, in this embodiment, the terminal connecting portion 16 and the heat dissipating member 24 have both a substantially flat plate shape. In the assembled state of the shield connector 10 (state of FIG. 3 before the insertion of the mating terminal 12), the terminal connecting portion 16 and the heat dissipating member 24 are arranged in parallel, but the right end surface of the terminal connecting portion 16 may be in contact with the connecting portion side contact surface 84 of the heat dissipating member 24 or may be facing the connecting portion side contact surface 84 while being slightly separated therefrom in the lateral direction.

Figure 10:
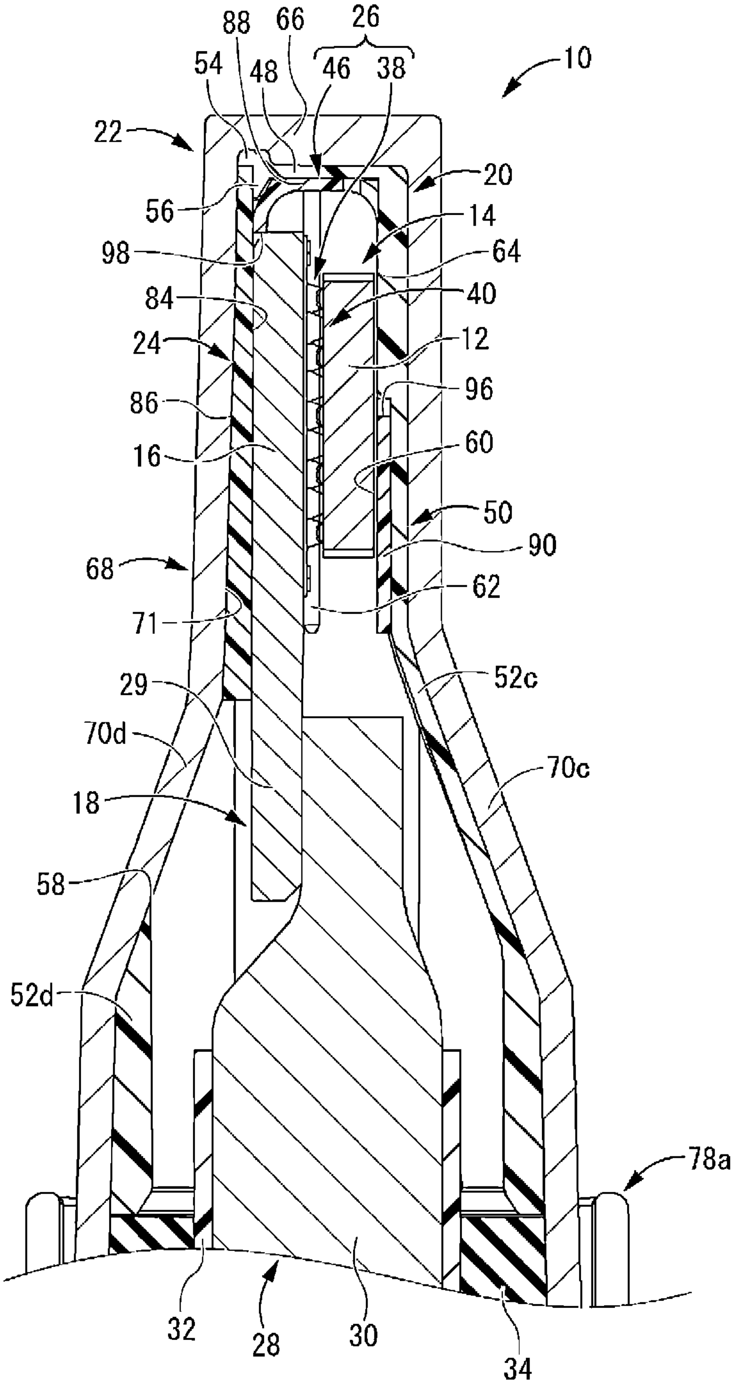
FIG. 10 is a vertical section, corresponding to FIG. 3, showing a state where a mating terminal is inserted in the shield connector shown in FIG. 1.
Figure 11:
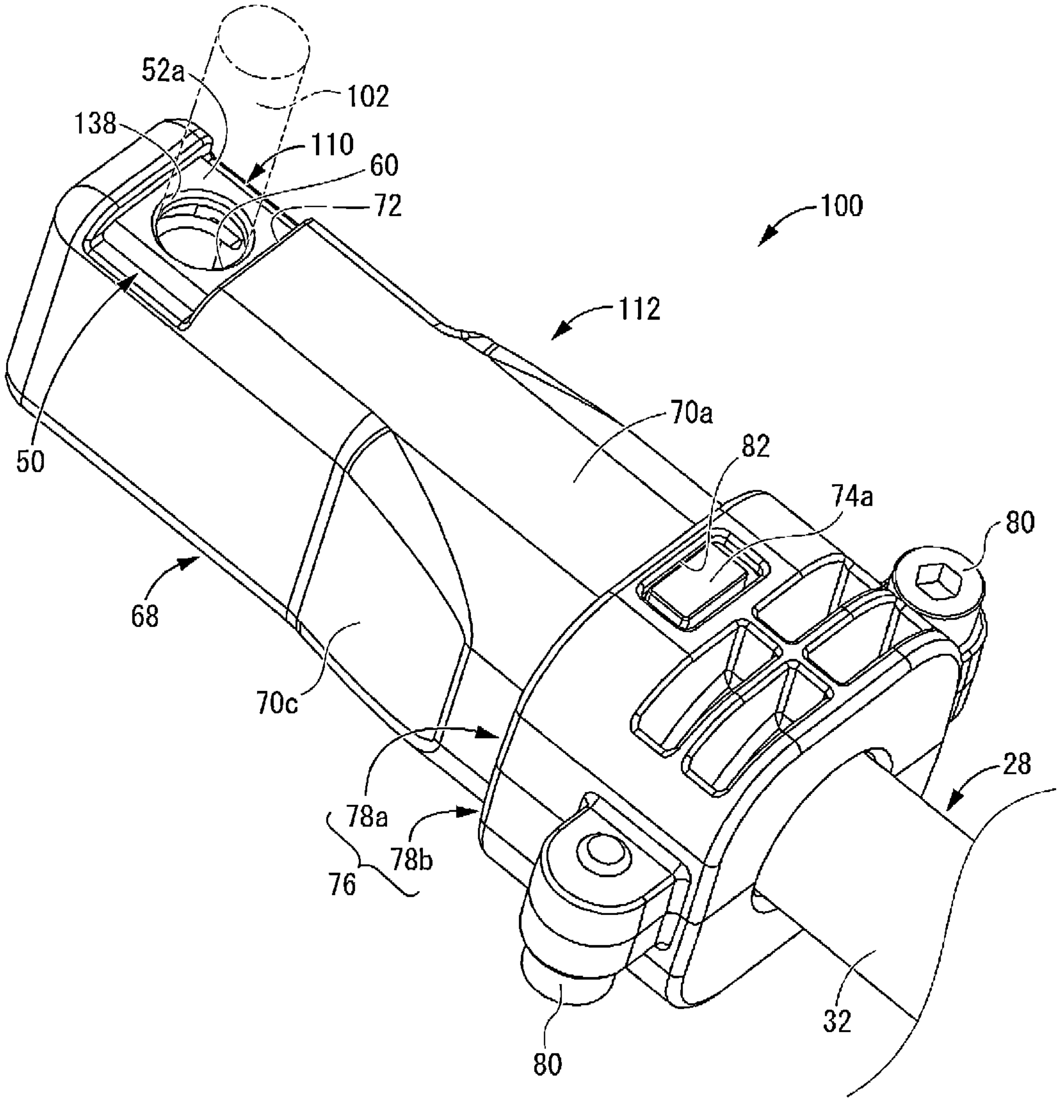
FIG. 11 is a perspective view of a shield connector according to a second embodiment.
Figure 12:
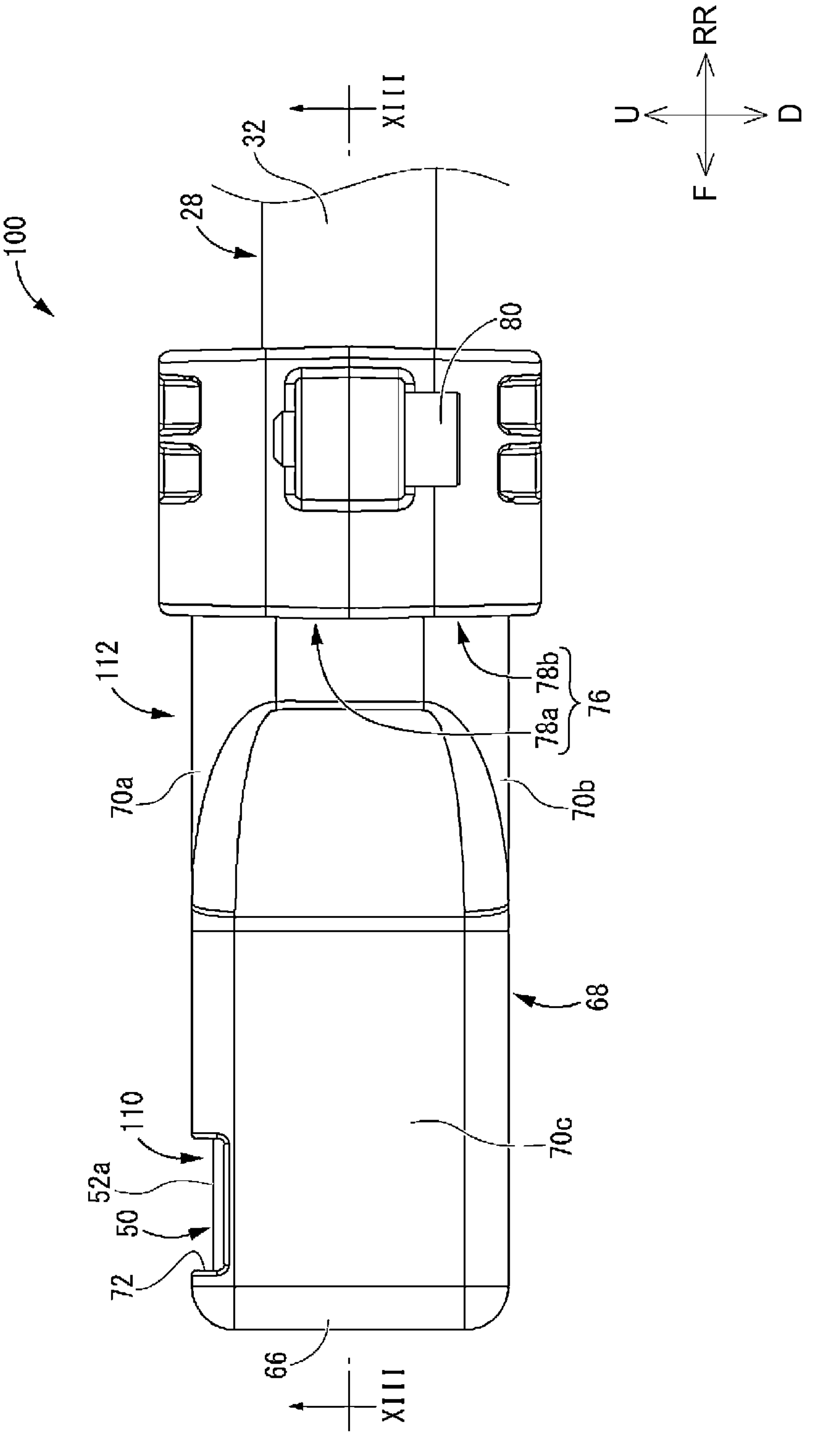
FIG. 12 is a right side view of the shield connector shown in FIG. 11.

In the shield connector 10 assembled in this way, the mating terminal 12 is inserted through the mating terminal insertion hole 60 and arranged in the mating terminal arrangement portion 14 as shown in FIG. 10, whereby the first pressing portion 40 is pushed and resiliently deformed between the terminal connecting portion 16 and the mating terminal 12. In other words, the insertion of the mating terminal 12 into the mating terminal arrangement portion 14 is allowed by the first pressing portion 40 being pushed and resiliently deformed by the mating terminal 12. In this way, the terminal connecting portion 16 and the mating terminal 12 contact via the first spring member 38 and are made electrically conductive.

Further, the terminal connecting portion 16 is pressed rightward with respect to the mating terminal 12 by a resilient restoring force of the first pressing portion 40 of the first spring member 38, and pressed against the connecting portion side contact surface 84 of the heat dissipating member 24 by this first pressing portion 40. The shell side contact surface 86 of the heat dissipating member 24 is pressed against the right end wall portion 70*d* of the shield shell 20 also by the pressing of the terminal connecting portion 16 toward the heat dissipating member 24. That is, in this embodiment, the shell side contact surface 86 of the heat dissipating member 24 is pressed against the contact flat surface 71 of the right end wall portion 70*d* of the shield shell 22 also by the resilient restoring force of the first pressing portion 40 associated with the insertion of the mating terminal 12 into the mating terminal arrangement portion 14 in addition to the resilient restoring forces of the pair of second pressing portions 92, 92 of the second spring member 46. As a result, heat generated along with the energization of the terminal connecting portion 16 and the mating terminal 12 is transferred to the shield shell 22 via the heat dissipating member 24 and dissipated to outside from the shield shell 22.

Particularly, since the wire connecting portion 29 to be fixed to the core wire 30 of the wire 28 is provided in the rear end part of the terminal fitting 18 in the first embodiment, not only heat generated at a contact point portion between the terminal connecting portion 16 and the mating terminal 12, but also heat generated in a connected part of the wire connecting portion 29 and the core wire 30 can also be dissipated via the heat dissipating member 24. That is, since heat generated in the connected part of the wire connecting portion 29 and the core wire 30 having a relatively large heat generation amount is also dissipated via the heat dissipating member 24 and the shield shell 22 in addition to heat generated between the terminal connecting portion 16 and the mating terminal 12, good heat dissipation is exhibited.

Accordingly, in this embodiment, the mating terminal arrangement portion 14 is provided in the front part smaller than the rear part in the internal space of the shield shell 22. In this way, the mating terminal 12 and the terminal connecting portion 16 can be arranged in the internal space of the smaller front part while an insertion region for an end part (part fixed to the terminal connecting portion 16) of the wire 28 is secured in the rear part of the internal space of the shield shell 22. As a result, a heat dissipation path from a part generating heat along with the energization of the terminal connecting portion 16 and the mating terminal 12 to a part of heat dissipation to outside via the heat dissipating member 24 and the shield shell 22 can be made shorter and heat dissipation efficiency is improved. Further, in this embodiment, the housing 20, the shield shell 22, the heat dissipating member 24 and the second spring member 46 constituting the shield shell side assembly 44 are assembled after being respectively separately formed. In this way, these members can be assembled after quality confirmation as to the occurrence of a short shot or the like in each member, and the shield connector 10 can stably exhibit desired heat dissipation performance.

In the shield connector 10 of this embodiment, the heat dissipating member 24 is provided on the heat dissipation path from the part generating heat along with the energization of the terminal connecting portion 16 and the mating terminal 12 to the part of the heat dissipation to outside via the shield shell 22, and the terminal connecting portion 16 is in contact with the shield shell 22 via the heat dissipating member 24 instead of an insulating resin portion molded as in a conventional structure. In this way, the formation of an air layer on the heat dissipation path, for example, due to the occurrence of a short shot or a void is avoided and a reduction in heat dissipation performance is prevented. Further, for example, if an environmental temperature largely changes, a gap (air layer) might be formed between members made of different materials due to a difference in linear expansion coefficient in the conventional structure. However, the shield connector 10 of this embodiment is provided with the spring member 26 for pressing the terminal connecting portion 16 against the heat dissipating member 24 and pressing the heat dissipating member 24 against the shield shell 22 with the mating terminal 12 arranged in the mating terminal arrangement portion 14. In this way, even if the environmental temperature largely changes, the formation of gaps between the terminal connecting portion 16 and the heat dissipating member 24 and between the heat dissipation 24 and the shield shell 22 is suppressed and a reduction in heat dissipation performance is prevented.

Further, since the terminal connecting portion 16 tending to get hot due to heat generated along with the energization of the mating terminal 12 can be brought into contact with the shield shell 22 via the heat dissipating member 24 and a short heat dissipation path can be set, heat dissipation performance can be improved. Since an improvement in heat dissipation performance is achieved as described above, the shield shell 22 in charge of dissipating heat to outside can be reduced in size and, consequently, the entire shield connector 10 is reduced in size and cost is also reduced by suppressing the amounts of necessary materials.

The spring member 26 of this embodiment includes the first spring member 38 provided in the terminal connecting portion 16, and the first spring member 38 includes the first pressing portion 40. The first pressing portion 40 can be resiliently deformed in arranging the mating terminal 12 into the mating terminal arrangement portion 14, and the terminal connecting portion 16 can be pressed against the heat dissipating member 24 and the heat dissipating member 24 can be pressed against the shield shell 22 by a resilient restoring force of the first pressing portion 40. As a result, not only conduction stability between the terminal connecting portion 16 and the mating terminal 12 is improved, but also the formation of gaps between the terminal connecting portion 16 and the heat dissipating member 24 and between the heat dissipating member 24 and the shield shell 22 is suppressed by the first spring member 38, whereby a reduction in heat dissipation performance is prevented.

The spring member 26 of this embodiment includes the second spring member 46 to be assembled with the housing 20, and the second spring member 46 includes the pair of second pressing portions 92, 92. A space between this pair of second pressing portions 92, 92 is the accommodation region 98 for accommodating the terminal connecting portion 16, and the terminal connecting portion 16 accommodated in the accommodation region 98 can directly contact the heat dissipating member 24 at the time of assembling the shield connector 10. In this way, the second spring member 46 is not interposed between the terminal connecting portion 16 and the heat dissipating member 24 and heat dissipation performance is improved by shortening the heat dissipation path. Further, since the pair of second pressing portions 92, 92 press the heat dissipating member 24 against the shield shell 22, the formation of a gap between the heat dissipating member 24 and the shield shell 22 is suppressed and heat dissipation performance is further improved.

Particularly, the second spring member 46 is provided with the base portion 90 facing the pair of second pressing portions 92, 92 in the lateral direction, and the pair of second pressing portions 92, 92 and the base portion 90 are spaced wider apart toward the rear side (with distance from the curved portion 88) in the state before the second spring member 46 is assembled with the housing 20. The pair of second pressing portions 92, 92 and the base portion 90 become parallel to each other by assembling the second spring member 46 with the housing 20. That is, the pair of second pressing portions 92, 92 and the base portion 90 are resiliently deformed inwardly in the facing direction by the heat dissipating member 24 and the left wall portion 52*c* of the housing 20 and the second spring member 46 is held in the housing 20 by the resilient restoring forces thereof by assembling the second spring member 46 with the housing 20. Therefore, by adopting the second spring member 46 having such a shape, the heat dissipating member 24 can be pressed against the shield shell 22 by the pair of second pressing portions 92, 92 and the second spring member 46 can be easily assembled with the housing 20 without providing any special mechanism in assembling the second spring member 46 with the housing 20.

Since the terminal connecting portion 16 and the heat dissipating member 24 have both a substantially flat plate shape and are arranged in parallel, a sufficiently large contact area can be ensured when the terminal connecting portion 16 and the heat dissipating member 24 contact, and heat dissipation performance is improved. Further, since the shell side contact surface 86 of the heat dissipating member 24 and the contact flat surface 71, which is the inner surface of the right end wall portion 70*d* of the shield shell 22, extend in parallel, the shell side contact surface 86 can substantially entirely contact the contact flat surface 71 when the shell side contact surface 86 and the contact flat surface 71 contact. In this way, a sufficiently large contact area can be ensured when the heat dissipating member 24 and the shield shell 22 contact, and heat dissipation performance is further improved.

The housing 20 includes the opening window 58 in the right wall portion 52*d*, and the heat dissipating member 24 is arranged in the front part of the opening window 58. Thus, the heat dissipating member 24 is exposed on the outer surface of the housing 20 and the outer surface of the housing 20 is covered by the shield shell 22, wherefore the heat dissipating member 24 is directly pressed toward the shield shell 22 through the opening window 58. Since the number of members on the heat dissipation path can be reduced and the heat dissipation path is shortened in this way, heat dissipation performance is improved.

Second Embodiment

Next, a shield connector 100 of a second embodiment of the present disclosure is described with reference to FIGS. 11 to 22. Although both the mating terminal 12, which is a male terminal, and the terminal connecting portion 16, which is a female terminal, have a substantially flat plate shape in the first embodiment, a mating terminal 102, which is a male terminal, is a columnar pin terminal and a terminal connecting portion 104, which is a female terminal, includes a tubular portion 106, into which the columnar mating terminal 102 is inserted. Note that, in the following description, the same members or parts as those of the first embodiment are denoted by the same reference signs as in the first embodiment in figures and not described in detail.

(Shield Connector 100)

Figure 15:
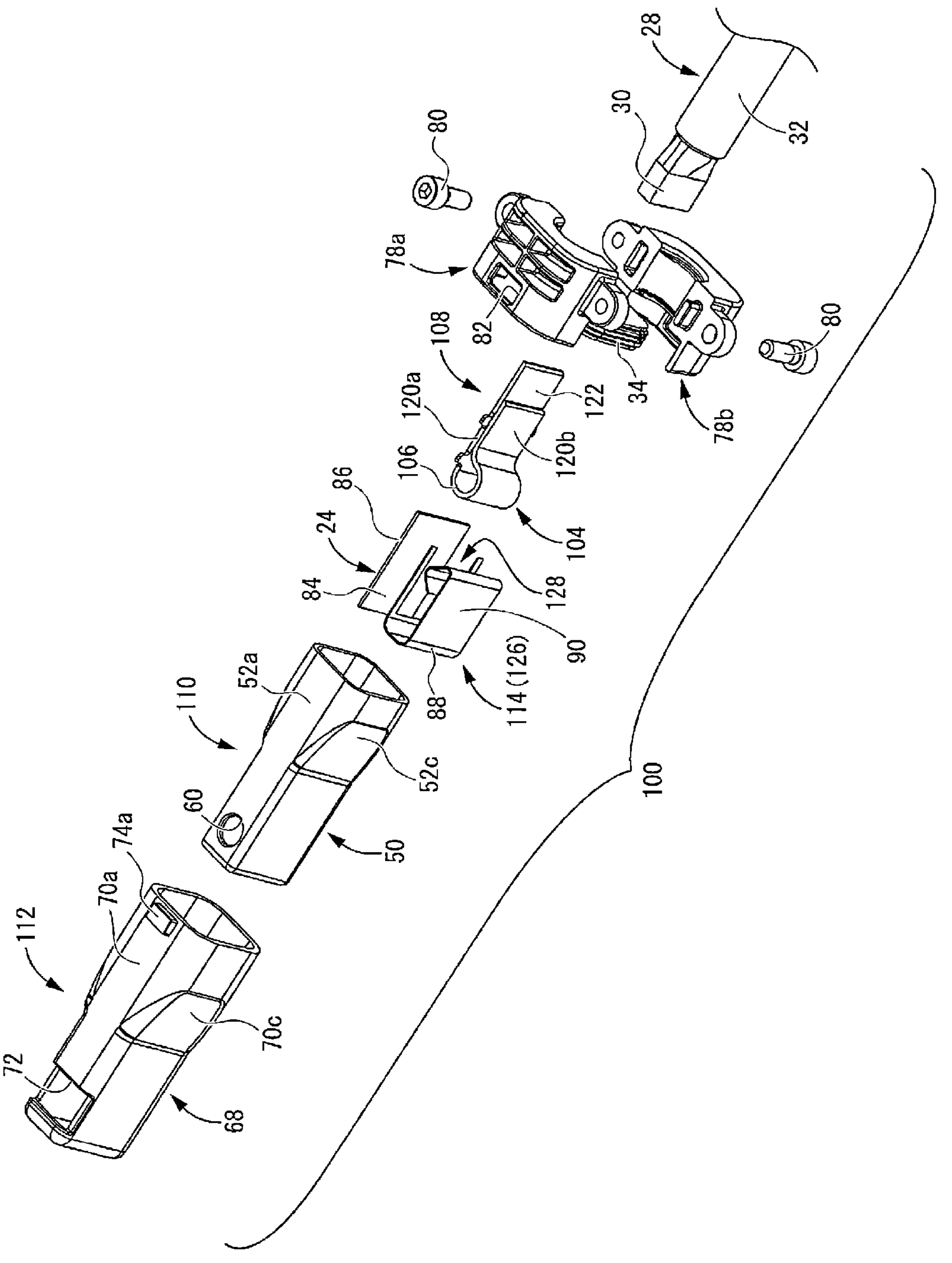
FIG. 15 is an exploded perspective view of the shield connector shown in FIG. 11.

The shield connector 100 has a structure similar to that of the shield connector 10 in the first embodiment as a whole and is provided with a terminal fitting 108 including the terminal connecting portion 104, a housing 110, a shield shell 112, a heat dissipating member 24 and a spring member 114 as shown in FIG. 15. Note that the heat dissipating member 24 is not described in detail since having a substantially flat plate shape as in the first embodiment and being made of a material similar to that of the first embodiment.

(Mating Terminal 102)

Figure 22:
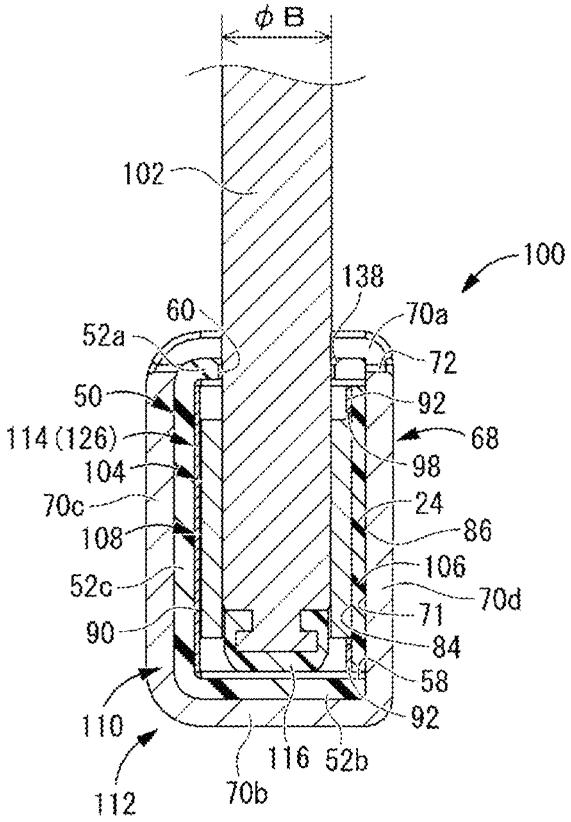
FIG. 22 is a section along XXII-XXII in FIG. 21.

As described above, the mating terminal 102 is columnar in the second embodiment. Particularly, the mating terminal 102 has a cylindrical shape in the second embodiment. The mating terminal 102 and the terminal connecting portion 104 are made conductive by inserting the mating terminal 102 into the tubular portion 106 of the terminal connecting portion 104 and bringing the outer peripheral surface of the mating terminal 102 and the inner peripheral surface of the tubular portion 106 into contact. Note that, in the second embodiment, a resin cap 116 is provided on the tip of the mating terminal 102 as shown in FIG. 22 to be described later.

(Terminal Fitting 108)

Figure 16:
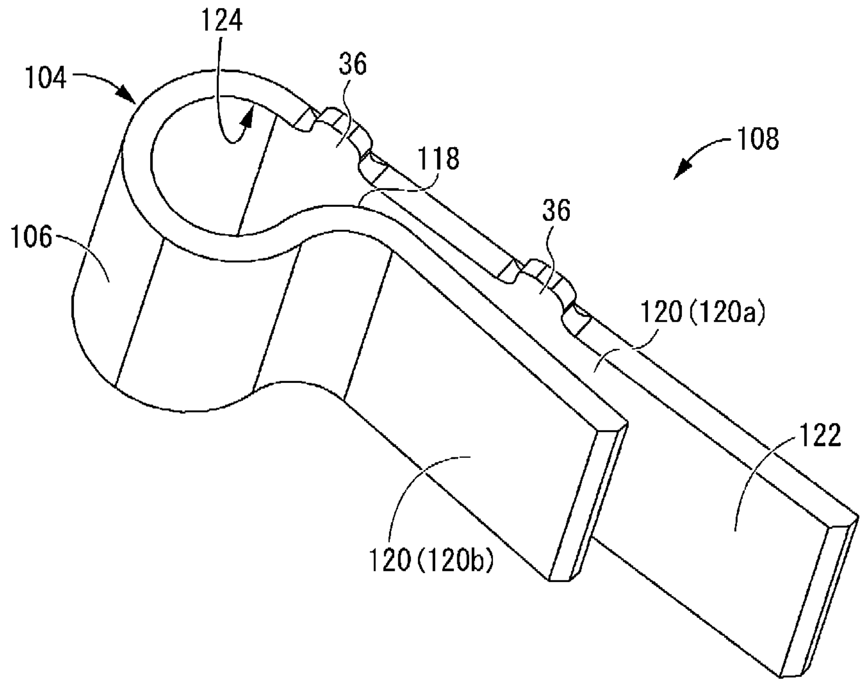
FIG. 16 is a perspective view showing a terminal fitting constituting the shield connector shown in FIG. 11 in a single state before being assembled with a housing.
Figure 17:
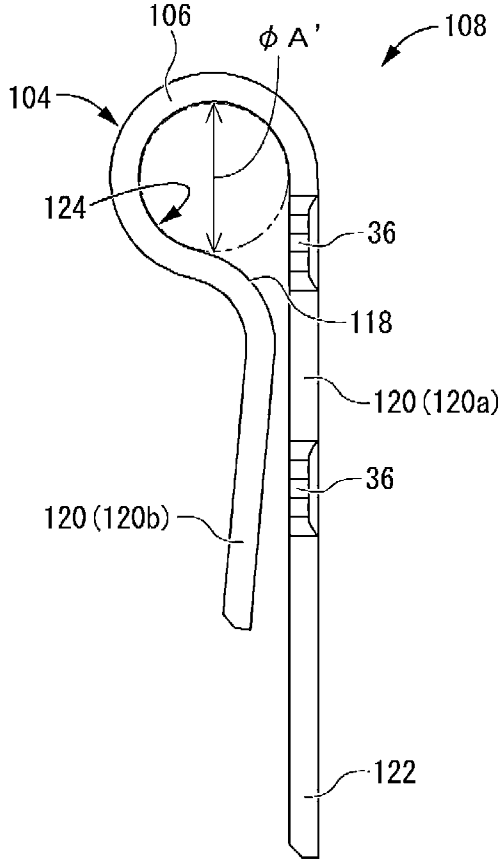
FIG. 17 is a right side view of the terminal fitting shown in FIG. 16.

As also shown in FIGS. 16 and 17, the terminal fitting 108 is formed using a strip-like flat metal plate as a whole, and this flat metal plate is bent into a predetermined shape. That is, by bending the flat metal plate, the tubular portion 106 having a substantially tube shape is formed by an intermediate part in a length direction of the flat metal plate. In the second embodiment, the tubular portion 106 has a substantially hollow cylindrical shape corresponding to the cylindrical mating terminal 102. A peripheral wall of this tubular portion 106 does not extend over an entire circumference, and a slit 118 extending over an entire length in an axial direction (direction orthogonal to the plane of FIG. 17, which is a width direction of the flat metal plate) of the tubular portion 106 is provided to divide the peripheral wall of the tubular portion 106.

In the peripheral wall of the tubular portion 106, a pair of flat plate-like portions 120, 120 constituted by both end parts in the length direction of the flat metal plate respectively project to an outer peripheral side of the tubular portion 106 from a pair of separated circumferential end surfaces. In the second embodiment, out of the pair of flat plate-like portions 120, 120, the right flat plate-like portion 120 in FIG. 17 located on a laterally outer side (right side) when the terminal fitting 108 is assembled with the housing 110 is a first flat plate-like portion 120*a*, which is one flat plate-like portion 120, and the left flat plate-like portion 120 in FIG. 17 is a second flat plate-like portion 120*b*, which is the other flat plate-like portion 120. In an assembled state of the shield connector 100 to be described later, the tubular portion 106 is provided in a front end part of the terminal connecting portion 104 in the terminal fitting 108, and the first and second flat plate-like portions 120*a*, 120*b* project rearward from the circumferential end surfaces separated by the slit 118 in the tubular portion 106. That is, in the second embodiment, the terminal connecting portion 104 includes the tubular portion 106 and the pair of flat plate-like portions 120, 120 (first and second flat plate-like portions 120*a*, 120*b*).

In FIGS. 16 and 17, the terminal fitting 108 in a single state before being assembled with the housing 110 (shield shell side assembly 136 to be described later) is shown, and the first and second flat plate-like portions 120*a*, 120*b* are separated from each other. In the second embodiment, in the single state of the terminal fitting 108, a separation distance gradually increases as the first and second flat plate-like portions 120*a*, 120*b* are more separated from the tubular portion 106. These first and second flat plate-like portions 120*a*, 120*b* are pressed by a third pressing portion 128 to overlap each other when the terminal fitting 108 is assembled with the housing 110 as described later. Further, in the second embodiment, a length of the first flat plate-like portion 120*a* is larger than that of the second flat plate-like portion 120*b*, and the first flat plate-like portion 120*a* projects more rearward than the second flat plate-like portion 120*b*. A wire connecting portion 122 to be connected to a core wire 30 exposed by stripping an insulation coating 32 in an external coated wire (wire 28) is constituted by a rear part of the first flat plate-like portion 120*a*.

In short, the wire connecting portion 122 is formed in one end part of the flat metal plate constituting the terminal fitting 108, and the first flat plate-like portion 120*a*, which is one flat plate-like portion 120, is constituted by a part connected to the wire connecting portion 122. A part connected to the first flat plate-like portion 120*a* is bent into a tube shape to form the tubular portion 106, and the second flat plate-like portion 120*b*, which is the other flat plate-like portion 120, is constituted by a part connected to a side of the tubular portion 106 opposite to the first flat plate-like portion 120*a*. In the second embodiment, the exposed core wire 30 is fixed to the wire connecting portion 122 from left, i.e. a laterally inner side. As in the first embodiment, positioning projections 36 deviated leftward are provided on both vertical sides of the first flat plate-like portion 120*a*.

Figure 13:
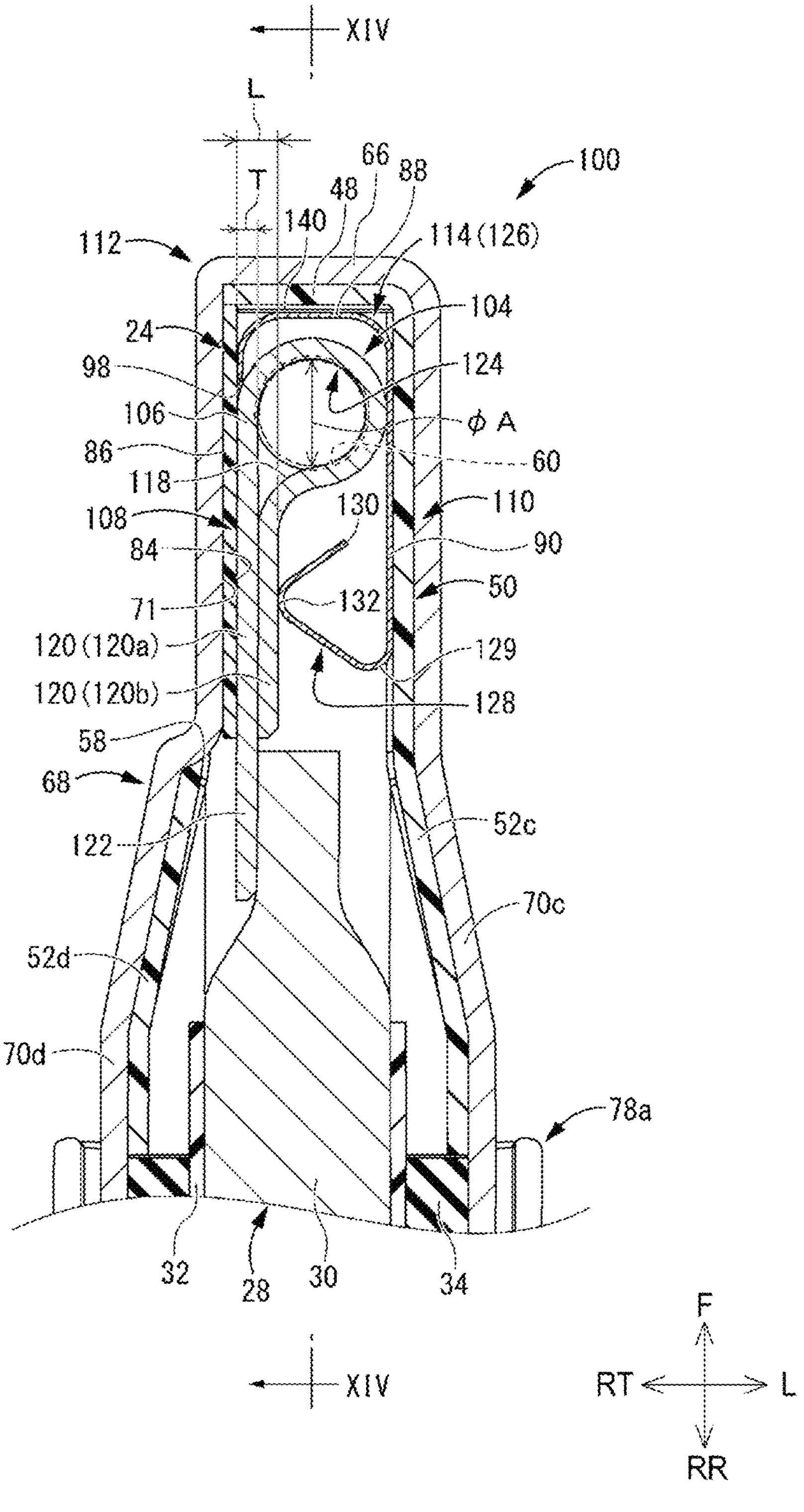
FIG. 13 is a section along XIII-XIII in FIG. 12.
Figure 14:
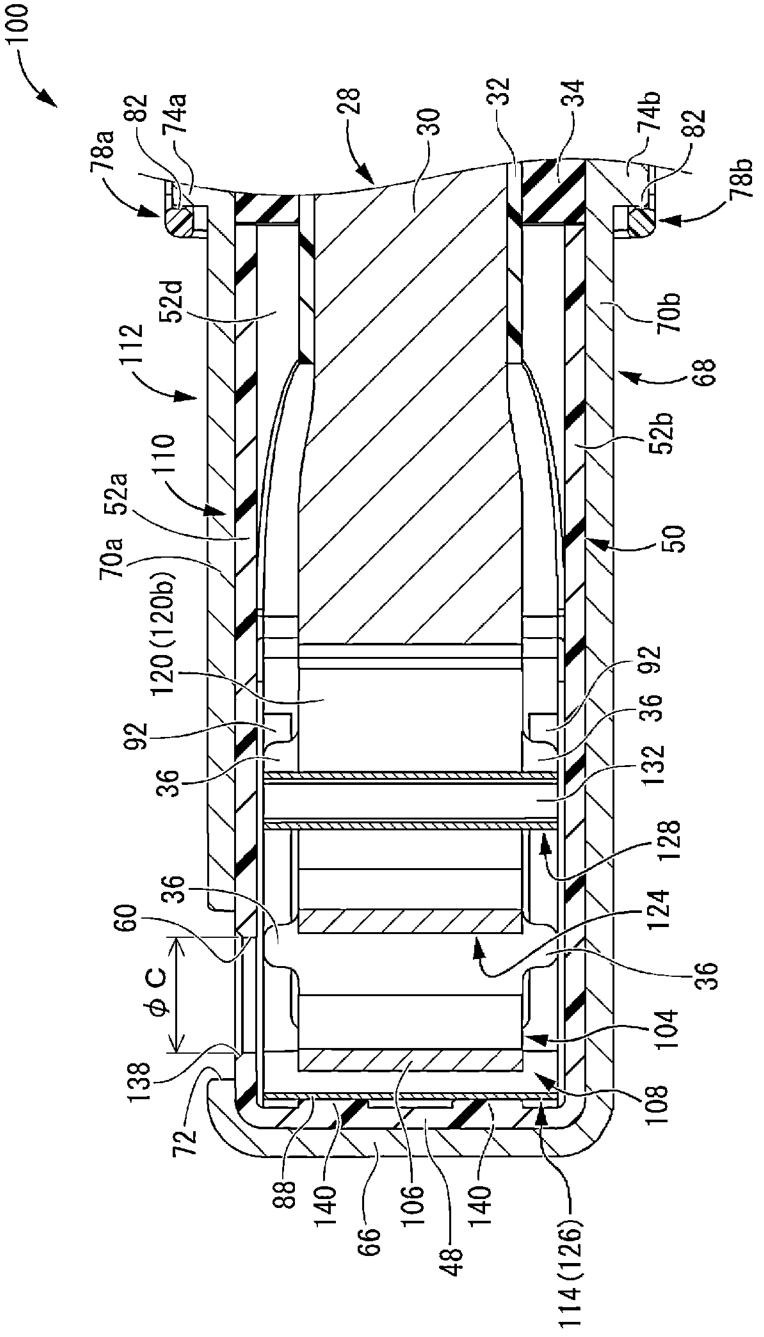
FIG. 14 is a section along XIV-XIV in FIG. 13.

Note that since the mating terminal 102 is inserted into the tubular portion 106 having a substantially hollow cylindrical shape, an internal space of the tubular portion 106 serves as a mating terminal arrangement portion 124 in which the mating terminal 102 is arranged. In short, the mating terminal arrangement portion 124 is defined inside the tubular portion 106 of the terminal fitting 108. As shown in FIG. 13, with the terminal fitting 108 assembled with the housing 110, the first and second flat plate-like portions 120*a*, 120*b* are overlapped each other by the third pressing portion 128 of a second spring member 126 to be described later and, in this state, an inner diameter of the mating terminal arrangement portion 124, i.e. an inner diameter ϕA of a virtual circle (shown by a two-dot chain line) formed to include the inner peripheral surface of the tubular portion 106, is slightly smaller than an outer diameter ϕB (see FIGS. 21 and 22) of the mating terminal 102. Note that in a state of FIG. 17 before the terminal fitting 108 is assembled with the housing 110, an inner diameter of the tubular portion 106 is ϕA' larger than ϕA and the inner diameter of the tubular portion 106 is kept at smaller ϕA by assembling the terminal fitting 108 with the housing 110 and overlapping the first and second flat plate-like portions 120*a*, 120*b*.

(Second Spring Member 126)

Figure 18:
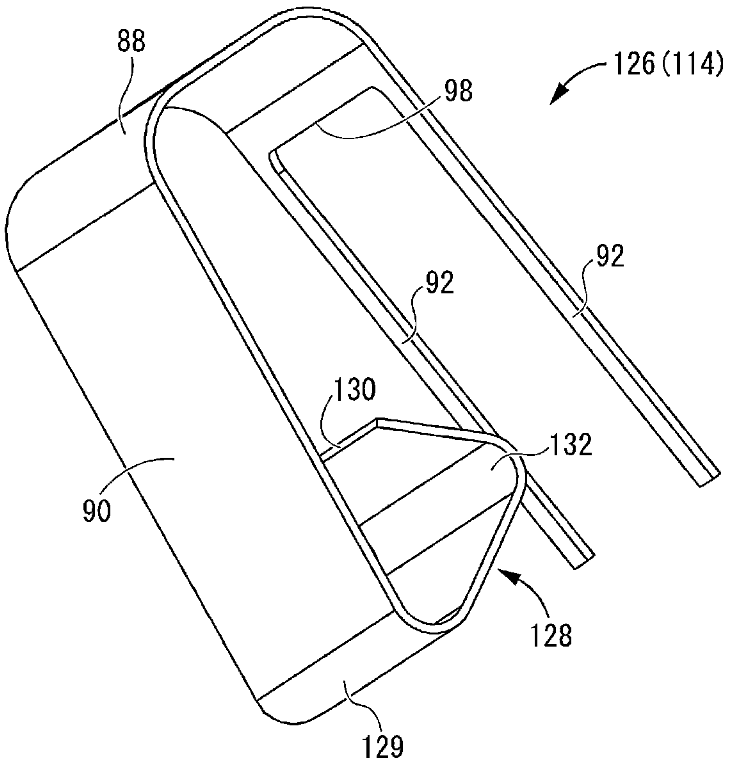
FIG. 18 is a perspective view showing a second spring member constituting the shield connector shown in FIG. 11 in a single state before being assembled with the housing.
Figure 19:
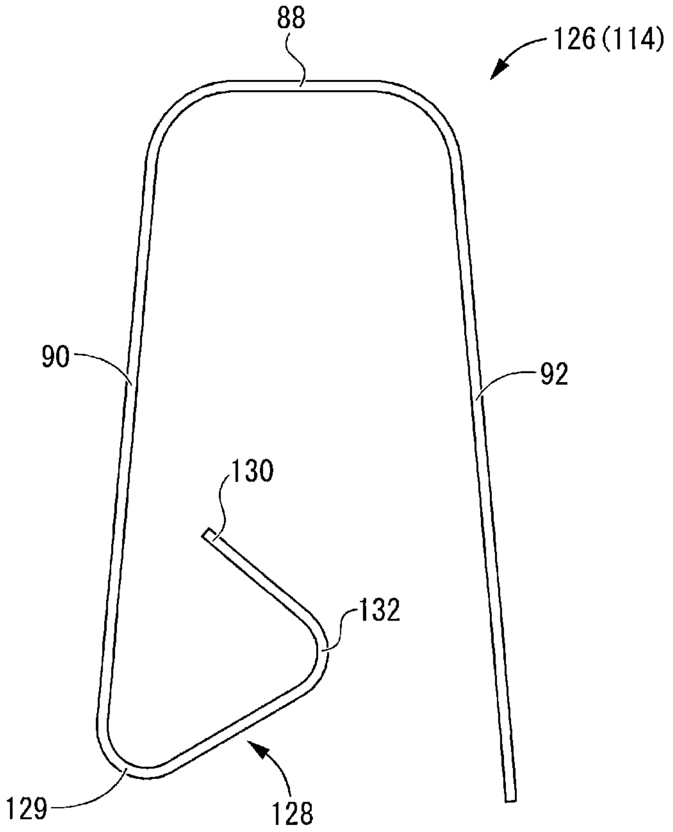
FIG. 19 is a right side view of the second spring member shown in FIG. 18.

Although the spring member 26 includes the first spring member 38 and the second spring member 46 in the first embodiment, the spring member 114 includes the second spring member 126 without including a first spring member in the second embodiment. The second spring member 126 is provided with a curved portion 88 extending in the lateral direction in a front end part as in the first embodiment as also shown in FIGS. 18 and 19. A base portion 90 projecting rearward is provided on one circumferential end (left end) of the curved portion 88, and a pair of second pressing portions 92, 92 projecting rearward are provided on the other circumferential end (right end) of the curved portion 88. The pair of second pressing portions 92, 92 are provided on both upper and lower ends of the other circumferential end (right end) of the curved portion 88, and a substantially rectangular region surrounded by the pair of second pressing portions 92, 92 and the curved portion 88 is an accommodation recess 98.

The second spring member 126 of the second embodiment includes the third pressing portion 128 for overlapping the pair of flat plate-like portions 120, 120 (first and second flat plate-like portions 120*a*, 120*b*) and pressing these against a connecting portion side contact surface 84 of the heat dissipating member 24. This third pressing portion 128 is provided on a free end part (rear end part) on a side opposite to a side connected to the curved portion 88 in the base portion 90 of the second spring member 126, a folded portion 129 is provided on a rear end part of the base portion 90, and the third pressing portion 128 is formed by folding a projecting end part 130 of the base portion 90 forward toward the curved portion 88. Further, a bent portion 132 is provided in an intermediate part on the free end part of the base portion 90 folded forward by the folded portion 129. That is, the projecting end part 130 on the free end side of the base portion 90 further projects toward the base portion 90 via the bent portion 132 after being bent forward at the folded portion 129 and projecting toward the second pressing portions 92 facing the base portion 90 in the lateral direction. The projecting end part 130 projecting toward the base portion 90 via the bent portion 132 is separated from and facing the base portion 90 in the lateral direction. In this way, the third pressing portion 128 including the bent portion 132 is integrally provided in the second spring member 126 in the second embodiment.

In FIGS. 18 and 19, the second spring member 126 is shown in a single state before being assembled with the housing 110 (shield shell side assembly 136 to be described later), a distance (lateral distance) between the facing surfaces of the base portion 90 and the second pressing portion 92 gradually increases with distance from the curved portion 88. By assembling the second spring member 126 with the housing 110, the base portion 90 and the second pressing portions 92 are respectively resiliently deformed inward in the lateral direction by being pressed by a left wall portion 52*c* of the housing 110 and the heat dissipating member 24, and the base portion 90 and the second pressing portions 92 become substantially parallel to each other.

By fixing the wire 28 having a waterproof rubber 34 mounted thereon to the wire connecting portion 122 provided in a rear end part of the terminal fitting 108 as described above and assembling the second spring member

Figure 20:
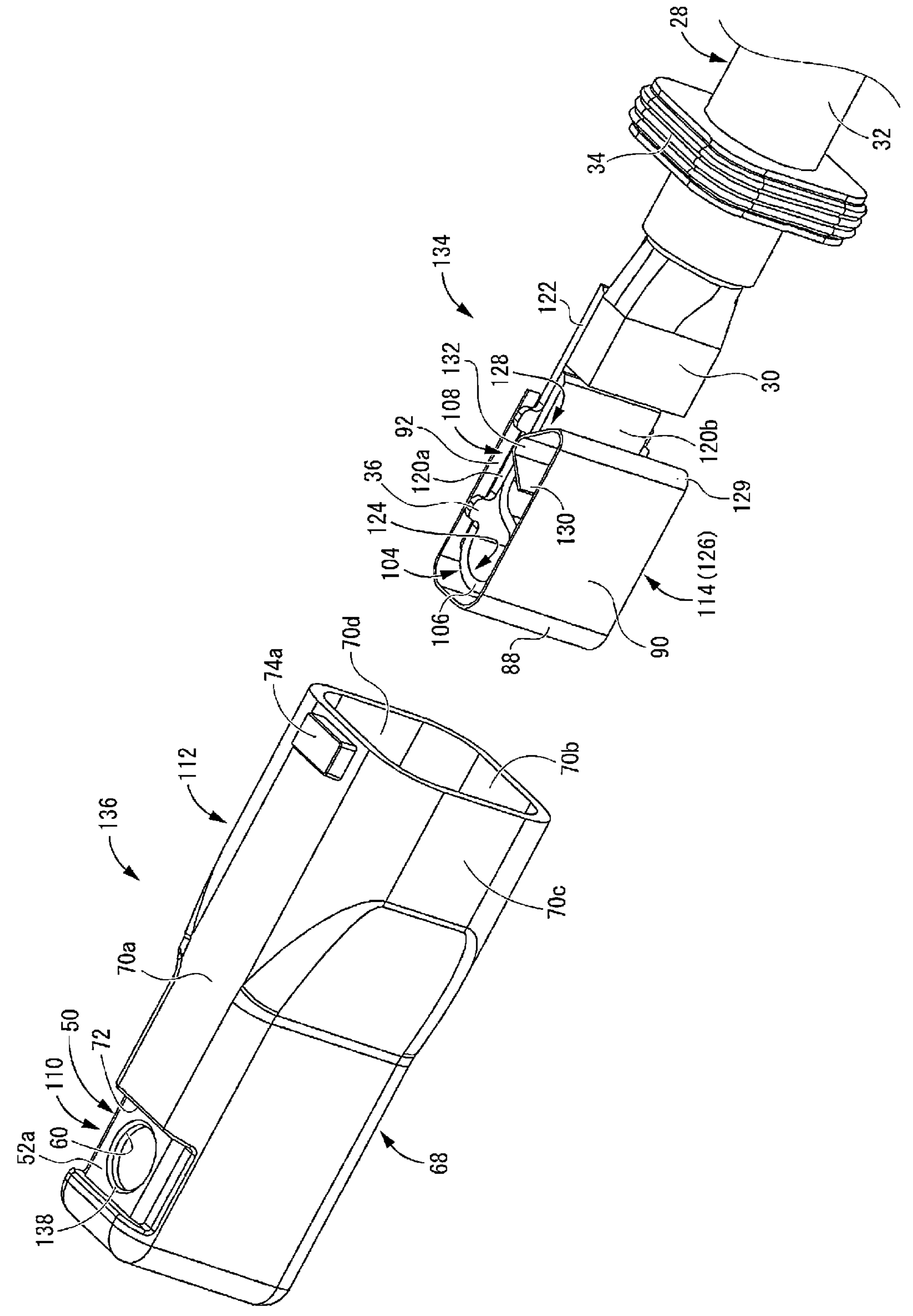
FIG. 20 is a view showing an intermediate state of an assembly process of the shield connector shown in FIG. 11 in a state before an assembly on a terminal fitting side is inserted into an assembly on a shield shell side.

126 with the front part of the terminal fitting 108, a terminal fitting side assembly 134 is configured as shown on a right side of FIG. 20. That is, the terminal fitting 108 is inserted into the second spring member 126 from a lateral side (from a direction orthogonal to the plane of FIG. 19), and the tubular portion 106 of the terminal connecting portion 104 is arranged in a space in front of the projecting end part 130 in an internal space of the second spring member 126. Further, the pair of flat plate-like portions 120, 120 (first and second flat plate-like portions 120*a*, 120*b*) of the terminal connecting portion 104 are located between the bent portion 132 of the second spring member 126 and each second pressing portion 92 facing each other in the lateral direction. The first flat plate-like portion 120*a* connected to the wire 28 projects further rearward than the second spring member 126. This terminal fitting side assembly 134 is assembled with the shield shell side assembly 136 shown on a left side of FIG. 20.

Note that although the terminal fitting side assembly 134 is shown in a state after being assembled with the shield shell side assembly 136 in FIG. 20, the base portion 90 and each second pressing portion 92 of the second spring member 126 are gradually separated toward the rear side as shown in FIGS. 18 and 19 and the pair of flat plate-like portions 120, 120 (first and second flat plate-like portions 120*a*, 120*b*) of the terminal connecting portion 104 are separated from each other as shown in FIGS. 16 and 17 in the terminal fitting side assembly 134 before being assembled with the shield shell side assembly 136.

The shield shell side assembly 136 of the second embodiment includes the housing 110, the shield shell 112 and the heat dissipating member 24. The housing 110 and the shield shell 112 are described below.

(Housing 110)

The housing 110 has a shape similar to that of the housing 20 in the first embodiment as a whole, and provided with a front wall portion 48 and a peripheral wall portion 50 composed of an upper wall portion 52*a*, a lower wall portion 52*b*, the left wall portion 52*c* and a right wall portion 52*d*. Further, the right wall portion 52*d* of the housing 110 is formed with an opening window 58 cut from the front wall portion 48 in a front end part to an intermediate part in the front-rear direction. Further, a substantially circular mating terminal insertion hole 60 penetrating in a thickness direction (vertical direction) is provided in a front part of the upper wall portion 52*a* of the housing 110. An inner diameter ϕC (see FIG. 14) of this mating terminal insertion hole 60 is slightly larger than the outer diameter ϕB of the mating terminal 102. In the second embodiment, a guiding taper 138 gradually widened in diameter toward an upper side is provided in an upper opening of the mating terminal insertion hole 60.

Further, in the second embodiment, rear projecting portions 140 projecting rearward are provided on the rear end surface of the front wall portion 48. The number, size, shape, position and the like of the rear projecting portions 140 are not limited, but two rear projecting portions 140 extending in the lateral direction are provided apart from each other in the vertical direction in the second embodiment. Note that, on the rear end surface of the front wall portion 48, the respective rear projecting portions 140 are not provided in a right end part where the heat dissipating member 24 is arranged. Such a housing 110 is also made of insulating synthetic resin as in the first embodiment and, for example, formed by molding.

(Shield Shell 112)

The shield shell 112 has a shape similar to that of the shield shell 22 in the first embodiment as a whole and is provided with a front end wall portion 66 and a tubular wall portion 68 composed of an upper end wall portion 70*a*, a lower end wall portion 70*b*, a left end wall portion 70*c* and a right end wall portion 70*d*. Further, a through window 72 penetrating in a thickness direction is formed in a front part of the upper end wall portion 70*a* of the shield shell 112. This through window 72 is formed at a position corresponding to the mating terminal insertion hole 60 in the housing 110 and an internal space of the housing 110 communicates with an external space through the mating terminal insertion hole 60 and the through window 72. Such a shield shell 112 is also, for example, made of metal excellent in heat dissipation as in the first embodiment.

(Assembly Process of Shield Connector 100)

Next, a specific example of an assembly process of the shield connector 100 is described. Note that the assembly process of the shield connector 100 is not limited to the one described below.

First, the terminal fitting 108 is formed by bending the flat metal plate into the aforementioned shape. Then, the wire 28 is fixed to the wire connecting portion 122 in the rear end part of the terminal fitting 108 and the second spring member 126 is assembled with the front part of the terminal fitting 108. Further, the waterproof rubber 34 is externally fit and mounted on the wire 28, whereby the terminal fitting side assembly 134 is completed.

Further, the shield shell 112, the housing 110 and the heat dissipating member 24 are respectively separately formed and prepared. Thereafter, the housing 110 is accommodated into the shield shell 112 by being inserted through a rear opening of the shield shell 112. Subsequently, the heat dissipating member 24 is inserted through the rear opening of the housing 110 and inserted between the right end wall portion 70*d* of the shield shell 112 and the respective rear projecting portions 140 of the housing 110 through the opening window 58 to bring a front end part of the heat dissipating member 24 into contact with the front wall portion 48 of the housing 110. In this way, the shell side contact surface 86 of the heat dissipating member 24 is exposed on the outer surface of the housing 110 through the opening window 58 and brought into contact with a contact flat surface 71, which is the inner surface of the right end wall portion 70*d* of the shield shell 112. As a result, the shield shell side assembly 136 is completed.

Thereafter, the completed terminal fitting side assembly 134 and shield shell side assembly 136 are opposed to each other in the front-rear direction as shown in FIG. 20, and the terminal fitting side assembly 134 is inserted into an internal space of the shield shell side assembly 136. In this way, the second spring member 126 and the front part of the terminal fitting 108 are arranged between the housing 110 and the heat dissipating member 24, the base portion 90 is overlapped on the left wall portion 52*c* of the housing 110 from inside and the pair of second pressing portions 92, 92 are overlapped on the heat dissipating member 24 from inside. As a result, the base portion 90 and the pair of second pressing portions 92, 92 are respectively pressed inward in a facing direction by the left wall portion 52*c* and the heat dissipating member 24, and resiliently deformed to become parallel to each other from a state gradually spaced wider apart toward the rear side. By resilient restoring forces of the base portion 90 and the pair of second pressing portions 92, 92, lateral outward biasing forces are applied to the left wall portion 52*c* and the heat dissipating member 24. In short, the left wall portion 52*c* is pressed against the left end wall portion 70*c* of the shield shell 112 by the base portion 90 and the heat dissipating member 24 is directly pressed against the right end wall portion 70*d* of the shield shell 112 through the opening window 58 by the pair of second pressing portions 92, 92. That is, the shell side contact surface 86 of the heat dissipating member 24 is pressed against the shield shell 112 by the pair of second pressing portions 92, 92.

By resiliently deforming the pair of second pressing portions 92, 92 leftward, i.e. inward in the facing direction, with respect to the base portion 90, the first flat plate-like portion 120*a* of the terminal fitting 108 is accommodated into the accommodation region 98 provided between the pair of second pressing portions 92, 92. In other words, with the terminal fitting 108 accommodated and arranged in the internal space of the second spring member 126, the pair of second pressing portions 92, 92 are resiliently deformed in directions toward the first flat plate-like portion 120*a*. In this way, the pair of second pressing portions 92, 92 separated from each other in the vertical direction come into contact with the respective positioning projections 36 projecting on both upper and lower sides of the first flat plate-like portion 120*a*, and the outer surface (right surface) of the first flat plate-like portion 120*a* is exposed on the outer surface of the second spring member 126 through the accommodation region 98.

Further, by deforming the base portion 90 rightward, i.e. inward in the facing direction, with respect to the pair of second pressing portions 92, 92, the third pressing portion 128 of the second spring member 126 pushes the second flat plate-like portion 120*b* rightward toward the first flat plate-like portion 120*a* to overlap the first and second flat plate-like portions 120*a*, 120*b*. In the second embodiment, the third pressing portion 128 is provided with the bent portion 132, and the bent portion 132 comes into contact with the second flat plate-like portion 120*b* to overlap the first and second flat plate-like portions 120*a*, 120*b*. Then, the bent portion 132 of the third pressing portion 128 presses the first and second flat plate-like portions 120*a*, 120*b* against the heat dissipating member 24 while overlapping the first and second flat plate-like portions 120*a*, 120*b*.

In short, with the base portion 90 and the pair of second pressing portions 92, 92 set parallel to each other, a separation distance L (see FIG. 13) in the lateral direction between the projecting end surface of the bent portion 132 and the outer surface (right surface) of each second pressing portion 92 is slightly smaller than twice the thickness T (see FIG. 13) of the flat metal plate constituting the terminal fitting 108 (2×T, i.e. a thickness of the first and second flat plate-like portions 120*a*, 120*b* in an overlapped state). In this way, with the second spring member 126 and the terminal fitting 108 accommodated and arranged between the heat dissipating member 24 and the housing 110 as shown in FIG. 13, the third pressing portion 128 is resiliently deformed by being pushed toward the base portion 90 with the folded portion 129 as a base point until L=(2×T) is reached by the bent portion 132 coming into contact with the first and second flat plate-like portions 120*a*, 120*b* overlapped on the heat dissipating member 24 from left. A resilient restoring force of this third pressing portion 128 acts as a biasing force toward each second pressing portion 92 (i.e. toward the heat dissipating member 24), and the first and second flat plate-like portions 120*a*, 120*b* are pressed toward the heat dissipating member 24 by the bent portion 132. In this way, the pair of flat plate-like portions 120, 120 (first and second flat plate-like portions 120*a*, 120*b*) are pressed against the connecting portion side contact surface 84 of the heat dissipating member 24 by a pressing force of the third pressing portion 128.

As a result, the outer surface (right surface) of the first flat plate-like portion 120*a* exposed from the outer surface of the second spring member 126 is pressed against the heat dissipating member 24. That is, in the first embodiment, the terminal connecting portion 16 (terminal fitting 18) is pressed against the heat dissipating member 24 by the first spring member 38. However, in the second embodiment, the terminal connecting portion 104 (terminal fitting 108) is pressed against the heat dissipating member 24 even in a state before the mating terminal 102 is arranged in the mating terminal arrangement portion 124. The shell side contact surface 86 of the heat dissipating member 24 is pressed against the right end wall portion 70*d* (contact flat surface 71) of the shield shell 112 also by a pressing force of the third pressing portion 128 for pressing the first and second flat plate-like portions 120*a*, 120*b* in addition to a pressing force of each second pressing portion 92 for pressing the heat dissipating member 24.

Note that the insertion of the terminal fitting side assembly 134 into the shield shell side assembly 136 is limited, for example, by the contact of the curved portion 88 on the front end of the second spring member 126 with the rear projecting portions 140 projecting rearward on the front wall portion 48 of the housing 110. Further, according to the insertion of the terminal fitting side assembly 134 into the shield shell side assembly 136, the waterproof rubber 34 is press-fit into the rear end part of the shield shell 112 to seal the rear opening of the shield shell 112 liquid-tight. Thereafter, upper and lower retainers 78*a*, 78*b* are assembled with the rear end part of the shield shell 112 from both upper and lower sides and fixed by a bolt 80. In this way, a retainer 76 is fixed to the rear end part of the shield shell 112 to complete the shield connector 100.

Figure 21:
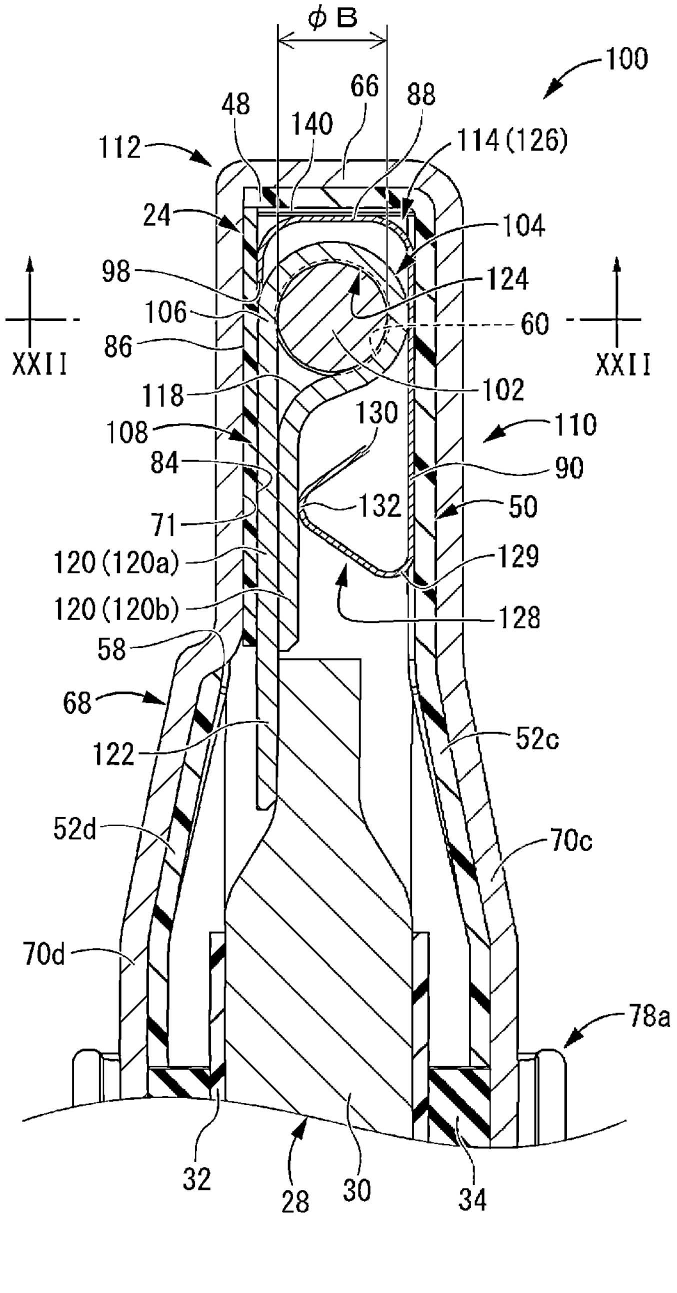
FIG. 21 is a vertical section, corresponding to FIG. 13, showing a state where a mating terminal is inserted in the shield connector shown in FIG. 11.

In the shield connector 100 assembled in this way, the tubular portion 106 constituting the mating terminal arrangement portion 124 is enlarged in diameter and deformed until the inner diameter ϕA of the tubular portion 106 becomes equal to the outer diameter ϕB of the mating terminal 102 by inserting the mating terminal 102 through the mating terminal insertion hole 60 as shown in FIGS. 21 and 22, whereby the insertion of the mating terminal 102 into the mating terminal arrangement portion 124 is allowed. That is, as described above, in a state before the mating terminal 102 is inserted into the mating terminal arrangement portion 124, the first and second flat plate-like portions 120*a*, 120*b* are overlapped by the third pressing portion 128, whereby the inner diameter ϕA of the mating terminal arrangement portion 124 is slightly smaller than the outer diameter ϕB of the mating terminal 102 and the mating terminal 102 is inserted substantially in a press-fit state while slightly enlarging a diameter of the mating terminal arrangement portion 124. As a result, with the mating terminal 102 inserted in the mating terminal arrangement portion 124, the inner peripheral surface of the tubular portion 106 and the outer peripheral surface of the mating terminal 102 are more reliably pressed in contact, and the terminal connecting portion 104 and the mating terminal 102 are made electrically conductive.

Note that the diameter enlarging deformation mode of the tubular portion 106 according to the insertion of the mating terminal 102 is not limited, but is achieved, for example, by pushing the second flat plate-like portion 120*b* continuous from the tubular portion 106 rearward (downward in FIG. 21) according to the insertion of the mating terminal 102 into the tubular portion 106. In such a case, the second flat plate-like portion 120*b* is displaced with respect to the first flat plate-like portion 120*a*, but the second flat plate-like portion 120*b* is slid and displaced in the front-rear direction with respect to the first flat plate-like portion 120*a* since the first and second flat plate-like portions 120*a*, 120*b* are maintained in the overlapped state by the third pressing portion 128 of the second spring member 126.

Further, with the mating terminal 102 inserted in the tubular portion 106, the first flat plate-like portion 120*a* of the terminal connecting portion 104 is overlapped on the heat dissipating member 24 and the heat dissipating member 24 is overlapped on the right end wall portion 70*d* of the shield shell 112. Specifically, the heat dissipating member 24 is pressed against the right end wall portion 70*d* of the shield shell 112 by the respective second pressing portions 92 of the second spring member 126. Further, the first and second flat plate-like portions 120*a*, 120*b* are overlapped and pressed against the right end wall portion 70*d* by the third pressing portion 128 of the second spring member 126. In this way, in the second embodiment, the heat dissipating member 24 is pressed against the right end wall portion 70*d* of the shield shell 112 via the first and second flat plate-like portions 120*a*, 120*b* also by the third pressing portion 128 of the second spring member 126. As a result, as in the first embodiment, heat generated along with the energization of the terminal connecting portion 104 and the mating terminal 102 is transferred to the shield shell 112 via the heat dissipating member 24 and dissipated to outside from the shield shell 112.

Further, since the first flat plate-like portion 120*a* is provided with the wire connecting portion 122 also in the second embodiment, not only heat generated at a contact point portion between the terminal connecting portion 104 and the mating terminal 102, but also heat generated in a connected part of the wire connecting portion 122 and the core wire 30 can be dissipated via the heat dissipating member 24. That is, heat generated in the connected part of the wire connecting portion 122 and the core wire 30 having a relatively large heat generation amount is also dissipated via the heat dissipating member 24 and the shield shell 112 in addition to heat generated between the terminal connecting portion 104 and the mating terminal 102, and good heat dissipation is exhibited.

In the second spring member 126, the projecting end part 130 of the base portion 90 projecting rearward is folded toward the curved portion 88 at the folded portion 129, whereby the third pressing portion 128 is formed. In this way, the third pressing portion 128 can be integrally formed to the second spring member 126 by a simple structure. Particularly, although the first spring member 38 for pressing the terminal connecting portion 16 against the heat dissipating member 24 and the second spring member 46 for pressing the heat dissipating member 24 against the shield shell 22 are separate bodies in the first embodiment, the respective second pressing portions 92 for pressing the heat dissipating member 24 against the shield shell 112 and the third pressing portion 128 for pressing the first and second flat plate-like portions 120*a*, 120*b* of the terminal connecting portion 104 against the heat dissipating member 24 are integrally provided to the second spring member 126 in the second embodiment. Thus, the number of components and the number of assembly steps are reduced.

Further, the third pressing portion 128 is provided with the bent portion 132 and held in contact with the second flat plate-like portion 120*b* at the bent portion 132. In this way, also when the third pressing portion 128 overlaps the first and second flat plate-like portions 120*a*, 120*b* and presses these toward the heat dissipating member 24, for example, the projecting end part 130 of the base portion 90 does not come into contact with the heat dissipating member 24 and friction between the third pressing portion 128 and the second flat plate-like portion 120*b* is reduced.

In the second embodiment, the terminal fitting 108 is formed using the strip-like flat metal plate, the tubular portion 106 is constituted by an intermediate part of the flat metal plate by bending the flat metal plate, and the pair of flat plate-like portions 120, 120 (first and second flat plate-like portions 120*a*, 120*b*) are constituted by the both end parts of the flat metal plate. Therefore, the tubular portion 106, the pair of flat plate-like portions 120, 120 (first and second flat plate-like portions 120*a*, 120*b*) and the wire connecting portion 122 can be configured with a simple structure and a small number of components.

Other Embodiments

The technique described in this specification is not limited to the above described and illustrated embodiments. For example, the following embodiments are also included in the technical scope of the technique described in this specification.

(1) In the first embodiment, the spring member 26 includes the first spring member 38 for pressing the terminal connecting portion 16 against the connecting portion side contact surface 84 of the heat dissipating member 24 and the second spring member 46 for pressing the shell side contact surface 86 of the heat dissipating member 24 against the shield shell 22 with the mating terminal 12 arranged in the mating terminal arrangement portion 14, and two separate spring members (first and second spring members 38, 46) having different functions are adopted. However, there is no limitation to such a mode. For example, as in the second embodiment, the spring member may be composed of one member and have a function of pressing the terminal connecting portion against the heat dissipating member and a function of pressing the heat dissipating member against the shield shell in different locations thereof. Specifically, for example, the first and second spring members 38, 46 in the first embodiment may be integrally formed, a part corresponding to the first spring member is fixed to the terminal connecting portion of the terminal fitting, and the terminal fitting side assembly may be configured to include a part corresponding to the second spring member. Then, the terminal fitting side assembly may be assembled with the shield shell side assembly composed of the shield shell, the housing and the heat dissipating member. Alternatively, although one spring member 114 (second spring member 126) having different functions in different locations is adopted in the second embodiment, a spring member having a function of overlapping the first and second flat plate-like portions and pressing these against the heat dissipating member and a separate spring member having a function of pressing the heat dissipating member against shield shell may be adopted in the second embodiment.

Note that since the first spring member in the first embodiment needs to make the terminal connecting portion and the mating terminal electrically conductive, the first spring member needs to have somewhat good electrically conductive performance. However, after the first spring member and the second spring member are integrally molded using a synthetic resin, a part corresponding to the first spring member may be plated with metal excellent in electrically conductive performance or the like. Of course, as in the above embodiment, the first spring member may be made of metal, the second spring member may be made of synthetic resin and these first and second spring members may be integrated by being fixed later.

Alternatively, one spring member may be adopted which has a function of pressing the terminal connecting portion against the heat dissipating member and a function of pressing the heat dissipating member against the shield shell in the same location with the mating terminal arranged in the mating terminal arrangement portion. For example, if the terminal connecting portion 16 is pressed against the heat dissipating member 24 and the heat dissipating member 24 is pressed against the shield shell 22 by a resilient restoring force of the first pressing portion 40 generated by the resilient deformation of the first pressing portion 40 according to the insertion of the mating terminal 12 in the first embodiment, the second spring member 46 is not essential. That is, the shield connector according to the first embodiment may include a spring member for at least pressing the terminal connecting portion toward the heat dissipating member (from left to right in the first embodiment) at the time of inserting the mating terminal. Similarly, if the third pressing portion 128 presses the first and second flat plate-like portions 120*a*, 120*b* against the heat dissipating member 24 and the heat dissipating member 24 is pressed against the shield shell 112 in the second embodiment, each second pressing portion 92 is not essential. Note that the first and second spring members are not limited to those having the shapes as illustrated in the first embodiment and may be, for example, a coil spring, a leaf spring and the like. Further, in the second embodiment, each second pressing portion 92 and the third pressing portion 128 are not limited to those having the shapes described above, and the third pressing portion may be, for example, formed, such as by partially cutting and raising the base portion of the second spring member or a coil spring may be arranged as the third pressing portion between the base portion and the second flat plate-like portion.

(2) Although both the terminal connecting portion 16 and the mating terminal 12 have a flat plate shape in the first embodiment, the mating terminal may have a pin shape (cylindrical shape) and the terminal connecting portion may have a tube shape so that the mating terminal is inserted thereinto, for example, as in the second embodiment. In such a case, besides the mode illustrated in the second embodiment, a spring member may be provided on a circumferential part (e.g. right part) of the inner surface of the terminal connecting portion having the tube shape, and the spring member may be resiliently deformed according to the insertion of the mating terminal into the terminal connecting portion and the terminal connecting portion may be pressed against the mating terminal (e.g. from left to right) by a resilient restoring force of the spring member. In this way, the outer peripheral surface of the terminal connecting portion having the tube shape is pressed against the heat dissipating member and the heat dissipating member is pressed against the shield shell, whereby heat generated along with the energization of the terminal connecting portion and the mating terminal may be dissipated to outside via the heat dissipating member and the shield shell. Note that, in the second embodiment, the mating terminal may have, for example, a polygonal column shape other than a cylindrical shape, and the terminal connecting portion may have a polygonal tube shape corresponding to the mating terminal.

(3) Although the heat dissipating member 24 has a substantially flat plate shape and is made of ceramic in the first and second embodiments, a heat dissipating member is not limited if having an insulating property and may be, for example, made of synthetic resin or the like having a larger thermal conductivity than air, besides ceramic. Specifically, silicone-based resins and non-silicone-based resins such as acrylic-based resins and ceramic-based resins can be used. More particularly, a heat dissipation sheet, a heat dissipation gap filler, a thermal grease, a thermally conductive rubber and the like made of silicone-based resin can be cited as such. Further, although the terminal connecting portion 16 or the terminal connecting portion 104 (first flat plate-like portion 120*a*) directly contacts the heat dissipating member 24 and the heat dissipating member 24 directly contacts the shield shell 22, 112 in the first and second embodiments, a heat dissipation sheet, a heat dissipation gap filler, a thermal grease or the like as described above may be interposed between these members.

(4) Although the terminal connecting portion 16 and the connecting portion side contact surface 84 of the heat dissipating member 24 and the shell side contact surface 86 of the heat dissipating member 24 and the shield shell 22 are respectively in contact before the mating terminal 12 is inserted in the first embodiment, these may be facing each other while being slightly separated in the lateral direction or the terminal connecting portion and the heat dissipating member and/or the heat dissipating member and the shield shell may contact with the mating terminal inserted in the mating terminal arrangement portion. Further, in the second embodiment, the terminal connecting portion 104 (first and second flat plate-like portions 120*a*, 120*b*) is pressed against the heat dissipating member 24 and the heat dissipating member 24 is pressed against the shield shell 112 also before the mating terminal 102 is inserted. In short, the shield connector of the present disclosure may be configured such that the terminal connecting portion is pressed against the heat dissipating member and the heat dissipating member is pressed against the shield shell at least with the mating terminal arranged in the mating terminal arrangement portion, and a mode before the mating terminal is inserted is not limited.

(5) Although the terminal fitting 108 is formed by bending one strip-like flat metal plate into a predetermined shape in the second embodiment, there is no limitation to such a mode. That is, the tubular portion constituting the terminal connecting portion may be formed by a plurality of members. For example, two metal pieces including a semicircular curved part and a flat plate part extending from this curved part may be overlapped in the lateral direction, a spring member including a pressing portion like the third pressing portion may be provided, and the flat plate parts of the two metal pieces may be pressed in an overlapped state toward the heat dissipating member. By overlapping the semicircular parts of such metal pieces in the lateral direction, it is possible to form a tubular portion capable of being enlarged in diameter and deformed against a pressing force by the pressing portion when the mating terminal is inserted into the mating terminal arrangement portion.

LIST OF REFERENCE NUMERALS

10 shield connector (first embodiment)
12 mating terminal
14 mating terminal arrangement portion
16 terminal connecting portion
18 terminal fitting
20 housing
22 shield shell

24 heat dissipating member
26 spring member
28 wire
29 wire connecting portion
30 core wire
32 insulation coating
34 waterproof rubber
36 positioning projection
38 first spring member
40 first pressing portion
42 terminal fitting side assembly
44 shield shell side assembly
46 second spring member
48 front wall portion
50 peripheral wall portion
52*a* upper wall portion
52*b* lower wall portion
52*c* left wall portion
52*d* right wall portion
54 front protrusion
56 supporting protrusion
58 opening window
60 mating terminal insertion hole
62, 64 positioning rib
66 front end wall portion
68 tubular wall portion
70*a* upper end wall portion
70*b* lower end wall portion
70*c* left end wall portion
70*d* right end wall portion
71 contact flat surface
72 through window
74*a*, 74*b* positioning protrusion
76 retainer
78*a* upper retainer
78*b* lower retainer
80 bolt
82 positioning hole
84 connecting portion side contact surface
86 shell side contact surface
88 curved portion
90 base portion
92 second pressing portion
94 positioning recess
96 positioning groove
98 accommodation region
100 shield connector (second embodiment)
102 mating terminal
104 terminal connecting portion
106 tubular portion
108 terminal fitting
110 housing
112 shield shell
114 spring member
116 resin cap
118 slit
120 flat plate-like portion
120*a* first flat plate-like portion
120*b* second flat plate-like portion
122 wire connecting portion
124 mating terminal arrangement portion
126 second spring member
128 third pressing portion
129 folded portion
130 projecting end part
132 bent portion
134 terminal fitting side assembly
136 shield shell side assembly
138 guiding taper
140 rear projecting portion

What is claimed is:

1. A shield connector, comprising:

a terminal fitting including a mating terminal arrangement portion, a mating terminal being inserted into the mating terminal arrangement portion, and a terminal connecting portion to be connected to the mating terminal inserted and arranged in the mating terminal arrangement portion;

an insulating housing for accommodating the terminal fitting;

a shield shell for covering an outer surface of the housing;

an insulating heat dissipating member having a connecting portion side contact surface to be held in contact with the terminal connecting portion and a shell side contact surface to be exposed from the housing and held in contact with the shield shell with the mating terminal arranged in the mating terminal arrangement portion; and a spring member for pressing the terminal connecting portion against the connecting portion side contact surface of the heat dissipating member and pressing the shell side contact surface of the heat dissipating member against the shield shell.

2. The shield connector of claim 1, wherein the spring member includes a second spring member having a pair of second pressing portions for directly pressing parts of the connecting portion side contact surface of the heat dissipating member on both sides across a part held in contact with the terminal connecting portion.

3. The shield connector of claim 2, wherein:

the second spring member is assembled with the housing, and the second spring member includes a curved portion, a base portion projecting from one circumferential end of the curved portion and the pair of second pressing portions projecting from the other circumferential end of the curved portion, and a distance between facing surfaces of the base portion and the second pressing portions of the second spring member increases with distance from the curved portion in a state before being assembled with the housing.

4. The shield connector of claim 1, wherein the housing includes an opening window, and the heat dissipating member is directly pressed toward the shield shell through the opening window.

5. The shield connector of claim 1, wherein:

the spring member includes a first spring member provided in the terminal connecting portion and having a first pressing portion, and the first pressing portion allows insertion of the mating terminal into the mating terminal arrangement portion by being pushed and resiliently deformed by the mating terminal being inserted into the mating terminal arrangement portion, and presses the terminal fitting against the connecting portion side contact surface of the heat dissipating member and presses the shell side contact surface of the heat dissipating member against the shield shell by a resilient restoring force of the first pressing portion.

6. The shield connector of claim 5, wherein:

the terminal connecting portion and the heat dissipating member respectively have a flat plate shape and are arranged in parallel, one surface in a plate thickness direction of the heat dissipating member constitutes the connecting portion side contact surface and the other surface in the plate thickness direction of the heat dissipating member constitutes the shell side contact surface, and the other surface of the heat dissipating member is in contact with a contact flat surface of the shield shell extending in parallel to the other surface.

7. The shield connector of claim 3, wherein:

the terminal connecting portion of the terminal fitting includes a tubular portion defining the mating terminal arrangement portion inside and a pair of flat plate-like portions projecting to an outer peripheral side of the tubular portion from a pair of circumferential end surfaces separated by a slit extending over an entire length in an axial direction of the tubular portion while being separated from each other, the spring member includes a third pressing portion for overlapping the pair of flat plate-like portions and pressing the pair of flat plate-like portions against the connecting portion side contact surface of the heat dissipating member, and the mating terminal is allowed to be press-fit into the mating terminal arrangement portion by enlarging a diameter of the tubular portion, and the pair of flat plate-like portions are pressed against the connecting portion side contact surface of the heat dissipating member and the shell side contact surface of the heat dissipating member is pressed against the shield shell by a pressing force of the third pressing portion while the tubular portion is pressed into contact with the mating terminal.

8. The shield connector of claim 7, wherein the third pressing portion is constituted by a free end part projecting toward the second pressing portions by folding a projecting end part of the base portion toward the curved portion, and integrally provided to the second spring member.

9. The shield connector of claim 8, wherein the projecting end part of the base portion further projects toward the base portion via a bent portion after projecting toward the second pressing portions, and the bent portion is in contact with the flat plate-like portion.

10. The shield connector of claim 8, wherein:

the terminal fitting is formed using a strip-like flat metal plate, a wire connecting portion to be connected to a core wire of an external coated wire is formed in one end part of the flat metal plate, one of the pair of flat plate-like portions is constituted by a part connected to the wire connecting portion, a part connected to the one flat plate-like portion is bent into a tube shape to form the tubular portion, and the other of the pair of flat plate-like portions is constituted by a part connected to the tubular portion and the other flat plate-like portion is overlapped on the one flat plate-like portion.

* * * * *